United States Patent
Liu et al.

(10) Patent No.: US 11,858,536 B1
(45) Date of Patent: Jan. 2, 2024

(54) SYSTEMS AND METHODS FOR INTERACTIVE PREDICTION AND PLANNING

(71) Applicant: UATC, LLC, Mountain View, CA (US)

(72) Inventors: Jerry Junkai Liu, Toronto (CA); Wenyuan Zeng, Toronto (CA); Raquel Urtasun, Toronto (CA); Mehmet Ersin Yumer, Burlingame, CA (US)

(73) Assignee: UATC, LLC, Mountain View, CA (US)

( * ) Notice: Subject to any disclaimer, the term of this patent is extended or adjusted under 35 U.S.C. 154(b) by 0 days.

(21) Appl. No.: 17/516,260

(22) Filed: Nov. 1, 2021

Related U.S. Application Data

(60) Provisional application No. 63/108,340, filed on Oct. 31, 2020.

(51) Int. Cl.
*B60W 60/00* (2020.01)
*G06N 20/00* (2019.01)

(52) U.S. Cl.
CPC .... *B60W 60/0027* (2020.02); *B60W 60/0011* (2020.02); *G06N 20/00* (2019.01); *B60W 2554/40* (2020.02); *B60W 2554/80* (2020.02)

(58) Field of Classification Search
None
See application file for complete search history.

(56) References Cited

U.S. PATENT DOCUMENTS

| | | | | |
|---|---|---|---|---|
| 10,562,538 | B2* | 2/2020 | Lan | B60W 30/00 |
| 10,936,902 | B1* | 3/2021 | Bagwell | G06T 17/00 |
| 11,292,463 | B2* | 4/2022 | Hardy | B60W 60/0011 |
| 2009/0012703 | A1* | 1/2009 | Aso | G05D 1/0214 |
| | | | | 701/532 |
| 2009/0076702 | A1* | 3/2009 | Arbitmann | B60W 10/20 |
| | | | | 701/1 |
| 2018/0114072 | A1* | 4/2018 | Wang | G06V 10/85 |
| 2019/0377352 | A1* | 12/2019 | Weißwange | B60W 60/0027 |
| 2020/0249674 | A1* | 8/2020 | Dally | G05D 1/0088 |
| 2020/0258380 | A1* | 8/2020 | Wissing | G08G 1/04 |
| 2021/0046924 | A1* | 2/2021 | Caldwell | G05D 1/0088 |
| 2021/0149404 | A1* | 5/2021 | Zeng | G06V 10/255 |
| 2021/0181754 | A1* | 6/2021 | Cui | B60W 60/0011 |
| 2021/0188316 | A1* | 6/2021 | Marchetti-Bowick | |
| | | | | G06N 3/0454 |
| 2021/0200212 | A1* | 7/2021 | Urtasun | B60W 60/0011 |
| 2021/0276553 | A1* | 9/2021 | Niewiadomski | B60W 30/095 |
| 2021/0300412 | A1* | 9/2021 | Dingli | B60W 50/0098 |
| 2021/0319287 | A1* | 10/2021 | Refaat | H04W 4/029 |
| 2021/0370921 | A1* | 12/2021 | Silva | B60W 60/0027 |

(Continued)

OTHER PUBLICATIONS

Bandyopadhyay et al, "Intention-Aware Motion Planning", Algorithmic Foundations of Robotics, 2013, 17 pages.

(Continued)

*Primary Examiner* — David P. Merlino

(74) *Attorney, Agent, or Firm* — Dority & Manning, P.A.

(57) ABSTRACT

Example aspects of the present disclosure describe determining, using a machine-learned model framework, a motion trajectory for an autonomous platform. The motion trajectory can be determined based at least in part on a plurality of costs based at least in part on a distribution of probabilities determined conditioned on the motion trajectory.

20 Claims, 12 Drawing Sheets

(56) References Cited

U.S. PATENT DOCUMENTS

| | | | |
|---|---|---|---|
| 2021/0370972 A1* | 12/2021 | Bagschik | B60W 50/045 |
| 2022/0063663 A1* | 3/2022 | Wolff | B60W 30/18163 |
| 2022/0169244 A1* | 6/2022 | Sun | B60W 60/00276 |

OTHER PUBLICATIONS

Bansal et al, "ChauffeurNet: Learning to Drive by Imitating the Best and Synthesizing the Worst", arXiv:1812.03079v1, Dec. 7, 2018, 20 pages.

Belanger et al, "Structured Prediction Energy Networks" arXiv:1511.06350v3, Jun. 23, 2016, 12 pages.

Bojarski et al., End to End Learning for Self-Driving Cars. arXiv:1604.07316v1, Apr. 25, 2016, 9 pages.

Bouton et al, "Cooperation-Aware Reinforcement Learning for Merging in Dense Traffic", arXiv:1906.11021v1, Jun. 26, 2019, 7 pages.

Buehler et al, "The DARPA Urban Challenge: Autonomous Vehicles in City Traffic", Springer Publishing Company, Tracts in Advanced Robotics, vol. 56, 116 pages.

Caesar et al, "nuScenes: A Multimodal Dataset for Autonomous Driving", arXiv: 1903.11027v5, May 5, 2020, 16 pages.

Casas et al, "Implicit Latent Variable Model for Scene-Consistent Motion Forecasting", arXiv:2007.12036v1, Jul. 23, 2020, 44 pages.

Casas et al, "IntentNet: Learning to Predict Intention from Raw Sensor Data", arXiv:2101.07907v1, Jan. 20, 2021, 10 pages.

Casas et al., "SpAGNN: Spatially-Aware Graph Neural Networks for Relational Behavior Forecasting from Sensor Data", arXiv:1910.08233v1, Oct. 18, 2019, 11 pages.

Chai et al, "MultiPath: Multiple Probabilistic Anchor Trajectory Hypotheses for Behavior Prediction", arXiv:1910.05449v1, Oct. 12, 2019, 14 pages.

Chen et al, "Learning Deep Structured Models", arXiv:1407.2538v3, Apr. 27, 2015, 11 pages.

Codevilla et al., "End-to-End Driving via Conditional Imitation Learning", arXiv:1710.02410v2, Mar. 2, 2018, 8 pages.

Cosgun et al, "Towards Full Automated Drive in Urban Environments: A Demonstration in Gomentum Station, California", arXiv:1705.01187v1, May 2, 2017, 8 pages.

Cui et al, "Multimodal Trajectory Predictions for Autonomous Driving Using Deep Convolutional Networks", arXiv:1809.10732v2, Mar. 1, 2019, 7 pages.

Djuric et al, "Uncertainty-Aware Short-Term Motion Prediction of Traffic Actors for Autonomous Driving", arXiv:1808.05819v3, Mar. 4, 2020, 10 pages.

Dosovitskiy et al, "CARLA: An Open Urban Driving Simulator", arXiv:1711.03938v1, Nov. 10, 2017, 16 pages.

Fan et al, "Baidu Apollo EM Motion Planner", arXiv:1807.08048v1, Jul. 20, 2018, 15 pages.

Fisac et al, "Hierarchical Game—Theoretic Planning for Autonomous Vehicles", arXiv:1810.05766v1, Oct. 13, 2018, 7 pages.

Gao et al, "VectorNet: Encoding HD Maps and Agent Dynamics from Vectorized Representation", arXiv:04259v1, May 8, 2020, 9 pages.

Gupta et al, "Social GAN: Socially Acceptable Trajectories with Generative Adversarial Networks", arXiv:1803.10892v1, Mar. 29, 2018, 10 pages.

Hong et al, "Rules of the Road: Predicting Driving Behavior with a Convolutional Model of Semantic Interactions", arXiv:1906.08945v1, Jun. 21, 2019, 9 pages.

Kuleshov et al, "Neural Variational Inference and Learning in Undirected Graphical Models", arXiv:1711.02679v2, Nov. 16, 2017, 10 pages.

Lee et al, "DESIRE: Distant Future Prediction in Dynamic Scenes with Interacting Agents", arXiv:1704.04394v1, Apr. 14, 2017, 10 pages.

Lefevre et al, "A Survey on Motion Prediction and Risk Assessment for Intelligent Vehicles", Robomech Journal, Jul. 2014, 20 pages.

Li et al, "End-to-End Contextual Perception and Prediction with Interaction Transformer", arXiv:2008.05927v1, Aug. 13, 2020, 8 pages.

Liang et al, "Learning Lane Graph Representations for Motion Forecasting", arXiv:2007.13732v1, Jul. 27, 2020, 18 pages.

Liang et al, "PnPNet: End-to-End Perception and Prediction with Tracking in the Loop", arXiv:2005.14711v2, Jun. 27, 2020, 13 pages.

Luo et al, "Fast and Furious: Real Time End-to-End 3D Detection, Tracking and Motion Forecasting with a Single Convolutional Net", arXiv:2012.12395v1, Dec. 22, 2020, 9 pages.

Manivasagam et al, "LiDARsim: Realistic Lidar Simulation by Leveraging the Real World", arXiv:2006.09348v1, Jun. 16, 2020, 11 pages.

McEliece et al, "Turbo Decoding as an Instance of Pearl's "Belief Propagation" Algorithm", Journal on Selected Areas in Communications, vol. 16, No. 2, Feb. 1998, 13 pages.

Montemerlo et al, "Junior: The Stanford Entry in the Urban Challenge", Journal of Field Robotics vol. 25, Jan. 2008, 31 pages.

Muller et al, "Driving Policy Transfer via Modularity and Abstraction", arXiv:1804.09364v3, Dec. 13, 2018, 15 pages.

Phan-Minh et al, "Covernet: Multimodal Behavior Prediction Using Trajectory Sets", arXiv:1911.10298v2, Apr. 1, 2020, 12 pages.

Pomerleau, "ALVINN: An Autonomous Land Vehicle in a Neural Network" Conference on Neural Information Processing Systems, Nov. 27-30, 1989, Denver, Colorado, United States, 9 pages.

Rezende et al, "Variational Inference with Normalizing Flows", arXiv:1505.05770v6, Jun. 14, 2016, 10 pages.

Rhinehart et al, "Deep Imitative Models for Flexible Inference", arXiv:1810.06544v4, Oct. 1, 2019, 19 pages.

Rhinehart et al, "PRECOG: PREdiction Conditioned on Goals in Visual Multi-Agent Settings", arXiv:1905.01296v3, Sep. 30, 2019, 24 pages.

Rhinehart et al, "R2P2: A Reparameterized Pushforward Policy for Diverse, Precise Generative Path Forecasting", European Conference on Computer Vision, Sep. 8-14, 2018, Munich, Germany, 17 pages.

Sadat et al, "Jointly Learnable Behavior and Trajectory Planning for Self-Driving Vehicles", arXiv:1910.04586v1, Oct. 10, 2019, 8 pages.

Sadat et al, "Perceive, Predict, and Plan: Safe Motion Planning Through Interpretable Semantic Representations", arXiv:2008.05930v1, Aug. 13, 2020, 28 pages.

Sadigh et al, "Information Gathering Actions Over Human Internal State", Conference on Intelligent Robots and Systems, Oct. 9-14, 2016, Daejeon, Korea, 8 pages.

Sadigh et al, Planning for Autonomous Cars That Leverage Effects on Human Actions. Robotics: Science and Systems Conference, Jun. 18-22, 2016, Ann Arbor, Michigan, United States, 9 pages.

Sauer et al, "Conditional Affordance Learning for Driving in Urban Environments", arXiv:1806.06498v3, Nov. 3, 2018, 16 pages.

Saxena et al, "Driving in Dense Traffic with Model-Free Reinforcement Learning", arXiv:1909.06710v2, Nov. 16, 2020, 8 pages.

Schwing et al, "Fully Connected Deep Structured Networks", arXiv:1503.02351v1, Mar. 9, 2015, 10 pages.

Song et al, "PiP: Planning-Informed Trajectory Prediction for Autonomous Driving", arXiv:2003.11476v2, Jan. 18, 2021, 16 pages.

Sun et al, "Courteous Autonomous Cars", arXiv:1808.02633v2, Aug. 16, 2018, 9 pages.

Tang et al, "Multiple Futures Prediction", arXiv:1911.00997v2, Dec. 6, 2019, 17 pages.

Wang et al, "Efficient Inference for Continuous Markov Random Fields with Polynomial Potentials", Conference on Neural Information Processing Systems, Dec. 8-13, 2014, Montreal, Canada, 9 pages.

Wang et al, "Proximal Deep Structured Models", Conference on Neural Information Processing Systems, Dec. 5-10, 2016, Barcelona, Spain, 9 pages.

Welch et al, "An Introduction to the Kalman Filter", Department of Computer Science, University of North Carolina at Chapel Hill, Jul. 24, 2006, 16 pages.

(56) References Cited

OTHER PUBLICATIONS

Wiseman et al, "Amortized Bethe Free Energy Minimization for Learning MRFs", Conference on Neural Information Processing Systems, Dec. 8-14, 2019, Vancouver, Canada, 12 pages.
Yedidia et al, "Generalized Belief Propagation", Neural Information Processing Systems, 2000, Denver, Colorado, 7 pages.
Zeng et al, "DSDNet: Deep Structured Self-Driving Network", arXiv:2008.06041v1, Aug. 13, 2020, 24 pages.
Zeng et al, "End-to-End Interpretable Neural Motion Planner", arXiv:2102.06679v1, Jan. 17, 2021, 10 pages.
Ziebart, et al, "Maximum Entropy Inverse Reinforcement Learning", Conference on Artificial Intelligence, Jul. 13-17, 2008, Chicago, Illinois, United States, 6 pages.
Ziegler et al, "Trajectory Planning for BERTHA—a Local, Continuous Method", Intelligent Vehicles Symposium, Jun. 8-11, 2014, Dearborn, Michigan, United States, 8 pages.

\* cited by examiner

900

810 — OBTAINING SENSOR DATA DESCRIPTIVE OF AN ENVIRONMENT OF AN AUTONOMOUS VEHICLE, WHEREIN THE SENSOR DATA INCLUDES A REPRESENTATION OF AN OBJECT WITHIN THE ENVIRONMENT

920 — DETERMINING, USING A MACHINE-LEARNED MODEL FRAMEWORK INCLUDING ONE OR MORE MACHINE-LEARNED MODELS, A PLURALITY OF PREDICTED OBJECT TRAJECTORIES OF THE OBJECT BASED ON THE SENSOR DATA

930 — DETERMINING, USING THE MACHINE-LEARNED MODEL FRAMEWORK, A TARGET VEHICLE MOTION TRAJECTORY FOR THE AUTONOMOUS VEHICLE BASED ON THE PLURALITY OF PREDICTED OBJECT TRAJECTORIES AND A PREDICTED OBJECT INTERACTION WITH THE TARGET VEHICLE MOTION TRAJECTORY

940 — DETERMINING, USING THE MACHINE-LEARNED MODEL FRAMEWORK, A JOINT PROBABILITY DISTRIBUTION OVER THE PLURALITY OF PREDICTED OBJECT TRAJECTORIES, WHEREIN THE JOINT PROBABILITY DISTRIBUTION IS INDICATIVE OF PROBABILITIES FOR THE PLURALITY OF PREDICTED OBJECT TRAJECTORIES

*FIG. 9*

SYSTEMS AND METHODS FOR INTERACTIVE PREDICTION AND PLANNING

RELATED APPLICATION

The present application is based on and claims the benefit of U.S. Provisional Patent Application No. 63/108,340, filed Oct. 31, 2020, which is hereby incorporated by reference herein in its entirety.

BACKGROUND

An autonomous platform can process data to perceive an environment through which the platform can travel. For example, an autonomous vehicle can perceive its environment using a variety of sensors and identify objects around the autonomous vehicle. The autonomous vehicle can identify an appropriate path through the perceived surrounding environment and navigate along the path with minimal or no human input.

SUMMARY

Aspects and advantages of embodiments of the present disclosure are set forth in the following description. The present disclosure is directed to improved techniques for jointly predicting the motion of objects within the surrounding environment of an autonomous platform and planning the autonomous platform's motion based on how the objects are likely to interact with the autonomous platform's motion. For instance, the autonomous platform can be an autonomous vehicle operating within an environment. The autonomous vehicle can obtain contextual data associated with its environment. The contextual data can include, for example, sensor data indicative of the vehicle's surrounding environment as well as map data associated with the environment. The autonomous vehicle can process the sensor data to identify an object (e.g., another vehicle, etc.) located in a lane adjacent to the autonomous vehicle.

Using the machine-learned model framework of the present disclosure, the autonomous vehicle can plan its motion (e.g., for merging into the object's lane) based on how the object is likely to interact with the movement of the autonomous vehicle. More specifically, example implementations of the machine-learning model framework are trained to jointly (a) predict candidate object trajectories based on the contextual data and (b) determine a vehicle motion trajectory for the autonomous vehicle based on the candidate object trajectories using predicted interaction(s) of the object with the vehicle motion trajectory. The predicted interaction of the object can include, for example, the object yielding to the autonomous vehicle as the autonomous vehicle merges into the object's lane.

To jointly plan vehicle motion and predict object trajectories, example implementations of the machine-learned model framework of the present disclosure include a plurality of cost functions. The cost functions can relate to the vehicle motion trajectory for the autonomous vehicle, the predicted trajectories of the object, and a potential interaction between the object and the autonomous vehicle. In some implementations, the cost functions relate to potential interactions between objects and/or motion goals of the autonomous vehicle. In some implementations, the cost functions relate to a probability for a particular predicted object trajectory conditioned on a particular vehicle trajectory. In some implementations, the cost function(s) are learnable component(s) of the machine-learned model framework.

The machine-learned model framework can use a total cost that is a function of the above-mentioned cost functions to determine a vehicle motion trajectory for execution by the autonomous vehicle. For example, a plurality of candidate vehicle trajectories can be scored according to the cost function(s). A trajectory for execution can be selected based on the scores (e.g., as having the best score, such as the lowest cost). In this manner, the autonomous vehicle can leverage example implementations of the joint prediction/planning operations of the presently disclosed machine-learned model framework to better predict how objects will interact with the autonomous vehicle and plan the vehicle's motion accordingly. This can improve the ability and efficiency of the autonomous vehicle for completing complex maneuvers within an environment.

Example systems and methods according to aspects of the present disclosure provide various technical effects and benefits. For instance, example implementations of systems and methods according to the present disclosure provide for improved accuracy and realism of predictions for objects in an environment surrounding an autonomous platform. This can be accomplished by accounting for the objects' interactions with the platform's movement choices. For example, the movement of objects in real navigational environments (e.g., on travel ways) can be highly interdependent, as each object (or an operator thereof) can determine next steps and future goals based on the movement of other objects (e.g., to avoid the other objects and/or achieve its own goals). In this manner, for instance, the joint prediction and planning technology of the present disclosure more accurately reflects the interdependent nature of objects movement in real-world contexts and provides for more accurate generation of motion trajectories.

Additionally, example implementations of systems and methods according to the present disclosure provide for improved interpretability, model construction, and constraint enforcement. For example, the joint prediction/planning machine-learned model framework be trained in an end-to-end fashion while retaining interpretable intermediate components. For instance, one or more trajectories predicted for various objects (e.g., vehicles, actors, etc.) can be constructed to be more realistic. For example, one or more trajectories can be selected from a distribution of trajectories conforming to various structures based on a priori understandings of trajectories that are realistic in a given context or otherwise conform to expectations or imposed constraints. In this manner, for example, cost function(s) can be developed and learned that have an interpretable meaning (e.g., interactions can be explicitly modeled and detected, and scored accordingly). Thus, example implementations of systems and methods according to the present disclosure leverage the power of end-to-end training for improved processing of input data (e.g., with improved accuracy, efficiency, latency, etc.) while retaining interpretability and maintainability for future adaptation or updating needs.

Additionally, example implementations of systems and methods according to the present disclosure decrease processing latency by executing a joint prediction/planning machine-learned model framework. For example, interactive prediction and planning according to the present disclosure can be processed directly in some implementations (e.g., in a forward pass). In this manner, for example, latency can be decreased in the processing pipeline to achieve faster planning, even while obtaining more accurate predictions.

Additionally, example implementations of systems and methods according to the present disclosure expand the horizon of possible actions taken by an autonomous platform. For example, in some real-world scenarios, some motions desired to be taken by an autonomous platform can conflict with existing steady-state trajectories of other objects. The conflict can persist until the autonomous platform first initiates motion and allows the other objects to interact with the motion cooperatively and eliminate the conflict. Without an interactive planning framework that anticipates the other objects' interactions with the autonomous platform, for example, the autonomous platform can be precluded from taking any such action. In this manner, for instance, example implementations of systems and methods according to the present disclosure provide for increased motility and interaction for autonomous platforms in real-world contexts.

Example systems and methods according to aspects of the present disclosure offer various improvements over prior approaches. For example, prior techniques generally lack a joint prediction/planning framework that captures interdependence of object interactions. Various approaches that attempt interactive planning have only done so with hand-designed rewards or prediction models which can have difficulty accounting for all real-world scenarios in complex situations, or with frameworks that require costly sequential processing (e.g., decoding). Furthermore, prior machine-learned techniques have generally lacked interpretability (e.g., without interpretable components, such as interpretable intermediate representations, etc.).

In contrast, example implementations of systems and methods according to the present disclosure provide for a joint prediction/planning machine-learned model framework that overcomes the aforementioned disadvantages of prior techniques and achieves the technical effects and benefits mentioned above.

For example, in an aspect, the present disclosure provides an example method. The example method includes obtaining sensor data descriptive of an environment of an autonomous vehicle. In the example method, the sensor data includes a representation of an object within the environment. The example method includes determining, using a machine-learned model framework including one or more machine-learned models, a joint probability distribution over a plurality of predicted object trajectories of the object based on the sensor data. In the example method, the plurality of predicted object trajectories are conditioned on a plurality of potential vehicle motion trajectories of the autonomous vehicle. The example method includes determining, using the machine-learned model framework and from among the plurality of potential vehicle motion trajectories, a target vehicle motion trajectory for the autonomous vehicle based at least in part on the joint probability distribution and a plurality of costs. In the example method, the plurality of costs include a cost associated with the target vehicle motion trajectory, a cost associated with a respective predicted object trajectory of the plurality of predicted object trajectories, and a cost associated with a potential interaction between the object and the autonomous vehicle for the respective predicted object trajectory and the target vehicle motion trajectory.

In some implementations of the example method, the joint probability distribution is indicative of probabilities for the plurality of predicted object trajectories. In some implementations of the example method, each of the plurality of predicted object trajectories is conditioned on a conditioning set of the plurality of potential vehicle motion trajectories, the conditioning set comprising a plurality of potential vehicle motion trajectories. Some implementations of the example method further include decreasing an interactivity of the autonomous vehicle by increasing a size of the conditioning set.

In some implementations of the example method, the plurality of costs further include a goal-based cost associated with a motion goal of the autonomous vehicle. In some implementations of the example method, the goal-based cost includes a cost associated with a goal point for the autonomous vehicle or a goal line of a travel way for the autonomous vehicle. In some implementations of the example method, the plurality of costs further include a goal-based cost associated with a motion goal of the autonomous vehicle. In some implementations of the example method, the goal-based cost includes a cost associated with a goal point for the autonomous vehicle or a goal line of a travel way for the autonomous vehicle.

In some implementations of the example method, the plurality of costs include an interaction cost determined based on a predicted proximity between an object traversing a respective predicted object trajectory of the plurality of predicted object trajectories and the autonomous vehicle traversing a respective potential vehicle motion trajectory of the potential vehicle motion trajectories. In some implementations of the example method, the interaction cost is determined based on a comparison of the predicted proximity and a threshold proximity.

In some implementations of the example method, determining the target vehicle motion trajectory includes determining, using the machine-learned model framework, the plurality of potential vehicle motion trajectories for the autonomous vehicle, and selecting the target vehicle motion trajectory from among the plurality of potential vehicle motion trajectories based on a minimization of the plurality of costs.

In some implementations of the example method, determining the target vehicle motion trajectory includes determining, using the machine-learned model framework, the target vehicle motion trajectory based on the plurality of predicted object trajectories and a predicted object interaction with the target vehicle motion trajectory, wherein the predicted object interaction includes the object yielding to the autonomous vehicle.

In some implementations of the example method, the one or more machine-learned models are trained based on a loss determined over a subset of the plurality of predicted object trajectories. In some implementations of the example method, the subset is configured to exclude one or more of the predicted object trajectories that are within a tolerance distance of a corresponding ground truth object trajectory.

In some implementations of the example method, the sensor data further includes one or more past object trajectories of the object and map data associated with the environment.

Some implementations of the example method include initiating motion control of the autonomous vehicle based on the target vehicle motion trajectory.

In some implementations of the example method, the autonomous vehicle is a simulated autonomous vehicle, the object is a simulated object, and the environment is a simulated environment for the simulated autonomous vehicle and the simulated object.

For example, in an aspect, the present disclosure provides an example autonomous vehicle control system. The example autonomous vehicle control system includes one or more processors and one or more computer-readable media storing instructions that, when executed by the one or more processors, cause the example autonomous vehicle control system to perform operations. In the example autonomous vehicle control system, the operations include obtaining sensor data descriptive of an environment of an autonomous vehicle. In the example autonomous vehicle control system, the sensor data includes a representation of an object within the environment. In the example autonomous vehicle control system, the operations include determining, using a machine-learned model framework including one or more machine-learned models, a joint probability distribution over a plurality of predicted object trajectories of the object based on the sensor data. In the example autonomous vehicle control system, the plurality of predicted object trajectories are conditioned on a plurality of potential vehicle motion trajectories of the autonomous vehicle. In the example autonomous vehicle control system, the operations include determining, using the machine-learned model framework and from among the plurality of potential vehicle motion trajectories, a target vehicle motion trajectory for the autonomous vehicle based on the joint probability distribution and a plurality of costs. In the example autonomous vehicle control system, the plurality of costs include a cost associated with the target vehicle motion trajectory, a cost associated with a respective predicted object trajectory of the plurality of predicted object trajectories, and a cost associated with a potential interaction between the object and the autonomous vehicle for the respective predicted object trajectory and the target vehicle motion trajectory.

In some implementations of the example autonomous vehicle control system, the plurality of costs further include a goal-based cost associated with a motion goal of the autonomous vehicle. In some implementations of the example autonomous vehicle control system, the goal-based cost includes a cost associated with the autonomous vehicle travelling to a goal point or a goal line.

In some implementations of the example autonomous vehicle control system, determining the target vehicle motion trajectory includes determining, using a convolutional neural network, an intermediate spatial feature map for the object based on the sensor data, and determining, using a multilayer perceptron, a trajectory score for at least the respective predicted object trajectory based on the intermediate spatial feature map.

In some implementations of the example autonomous vehicle control system, the operations further include communicating data descriptive of the target vehicle motion trajectory for execution by the autonomous vehicle.

For example, in an aspect, the present disclosure provides an example autonomous vehicle. The example autonomous vehicle includes one or more processors and one or more computer-readable media storing instructions that, when executed by the one or more processors, cause the autonomous vehicle to perform operations. In the example autonomous vehicle, the operations include obtaining sensor data descriptive of an environment of an autonomous vehicle. In the example autonomous vehicle, the sensor data includes a representation of an object within the environment. In the example autonomous vehicle, the operations include determining, using a machine-learned model framework including one or more machine-learned models, a plurality of predicted object trajectories of the object based on the sensor data. In the example autonomous vehicle, the operations include determining, using the machine-learned model framework, a target vehicle motion trajectory for the autonomous vehicle based on the plurality of predicted object trajectories and a predicted object interaction with the target vehicle motion trajectory. In the example autonomous vehicle, the machine-learned model framework is configured to determine the target vehicle motion trajectory based on a plurality of costs. In the example autonomous vehicle, the plurality of costs include a cost associated with the target vehicle motion trajectory, a cost associated with a respective predicted object trajectory of the plurality of predicted object trajectories, and a cost associated with a potential interaction between the respective object and the autonomous vehicle for the respective predicted object trajectory and the target vehicle motion trajectory. In the example autonomous vehicle, the operations include controlling the autonomous vehicle based on the target vehicle motion trajectory.

In some implementations of the example autonomous vehicle, the plurality of costs further include a goal-based cost associated with a motion goal of the autonomous vehicle.

In some implementations of the example autonomous vehicle, determining the target vehicle motion trajectory includes determining, using the machine-learned model framework, a joint probability distribution over the plurality of predicted object trajectories. In some implementations of the example autonomous vehicle, the joint probability distribution is indicative of probabilities for the plurality of predicted object trajectories.

Other example aspects of the present disclosure are directed to other systems, methods, vehicles, apparatuses, tangible non-transitory computer-readable media, and devices for generating trajectories, training models, and performing other functions described herein. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 9 is a flowchart of an example method for joint planning/prediction according to some aspects of the present disclosure;

DETAILED DESCRIPTION

The following describes the technology of this disclosure within the context of an autonomous vehicle for example purposes only. As described herein, the technology described herein is not limited to an autonomous vehicle and can be implemented within other autonomous platforms and other computing systems.

Figure 1:
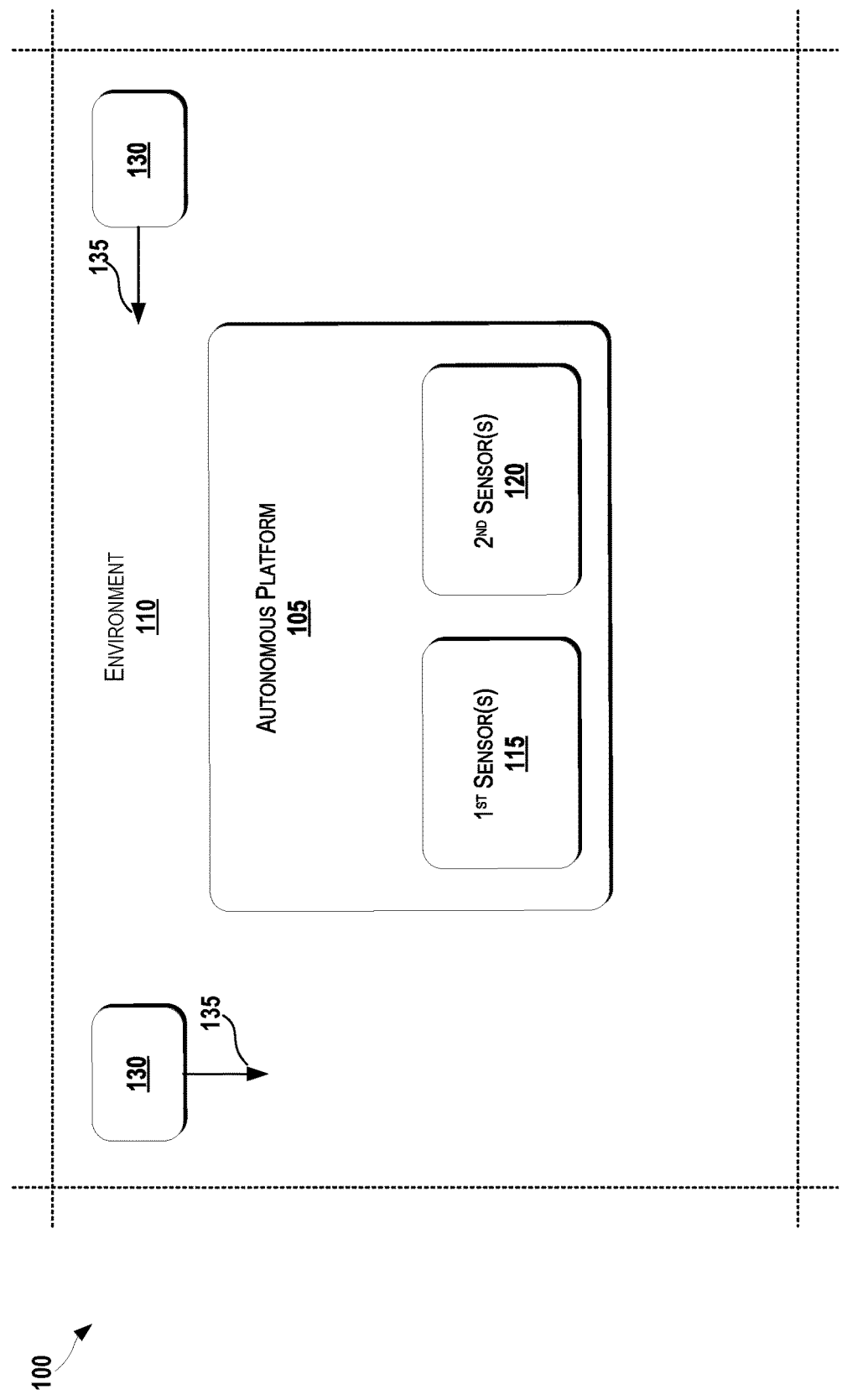
FIG. 1 is a block diagram of an operational scenario, according to some implementations of the present disclosure.

With reference now to FIGS. 1-11, example embodiments of the present disclosure will be discussed in further detail. FIG. 1 depicts a block diagram of an example operational scenario 100 according to example implementations of the present disclosure. The operational scenario 100 includes an autonomous platform 105 and an environment 110. The environment 110 can be external to the autonomous platform 105. The autonomous platform 105, for example, can operate within the environment 110. The environment 110 can include an indoor environment (e.g., within one or more facilities, etc.) or an outdoor environment. An outdoor environment, for example, can include one or more areas in the outside world such as, for example, one or more rural areas (e.g., with one or more rural travel ways, etc.), one or more urban areas (e.g., with one or more city travel ways, highways, etc.), one or more suburban areas (e.g., with one or more suburban travel ways, etc.), etc. An indoor environment, for example, can include environments enclosed by a structure such as a building (e.g., a service depot, manufacturing facility, etc.).

The environment 110 can include one or more dynamic object(s) 130 (e.g., simulated objects, real-world objects, etc.). The dynamic object(s) 130 can include any number of moveable objects such as, for example, one or more pedestrians, animals, vehicles, etc. The dynamic object(s) 130 can move within the environment according to one or more trajectories 135. Although trajectories 135 are depicted as emanating from dynamic object(s) 130, it is also to be understood that relative motion within the environment 110 can include one or more trajectories of the autonomous platform 105 itself. For instance, aspects of the present disclosure relate to the generation of trajectories via a joint prediction/planning framework, and those trajectories can, in various implementations, take into account trajectories 135 of the dynamic object(s) 130 and/or one or more trajectories of the autonomous platform 105 itself.

The autonomous platform 105 can include one or more sensor(s) 115, 120. The one or more sensors 115, 120 can be configured to generate or store data descriptive of the environment 110 (e.g., one or more static or dynamic objects therein, etc.). The sensor(s) 115, 120 can include one or more LIDAR systems, one or more Radio Detection and Ranging (RADAR) systems, one or more cameras (e.g., visible spectrum cameras or infrared cameras, etc.), one or more sonar systems, one or more motion sensors, or other types of image capture devices or sensors. The sensor(s) 115, 120 can include multiple sensors of different types. For instance, the sensor(s) 115, 120 can include one or more first sensor(s) 115 and one or more second sensor(s) 120. The first sensor(s) 115 can include a different type of sensor than the second sensor(s) 120. By way of example, the first sensor(s) 115 can include one or more imaging device(s) (e.g., cameras, etc.), whereas the second sensor(s) 120 can include one or more depth measuring device(s) (e.g., LIDAR device, etc.).

The autonomous platform 105 can include any type of platform configured to operate within the environment 110. For example, the autonomous platform 105 can include one or more different type(s) of vehicle(s) configured to perceive and operate within the environment 110. The vehicles, for example, can include one or more autonomous vehicle(s) such as, for example, one or more autonomous trucks. By way of example, the autonomous platform 105 can include an autonomous truck, including an autonomous tractor coupled to a cargo trailer. In addition, or alternatively, the autonomous platform 105 can include any other type of vehicle such as one or more aerial vehicles, ground-based vehicles, water-based vehicles, space-based vehicles, etc.

Figure 2:
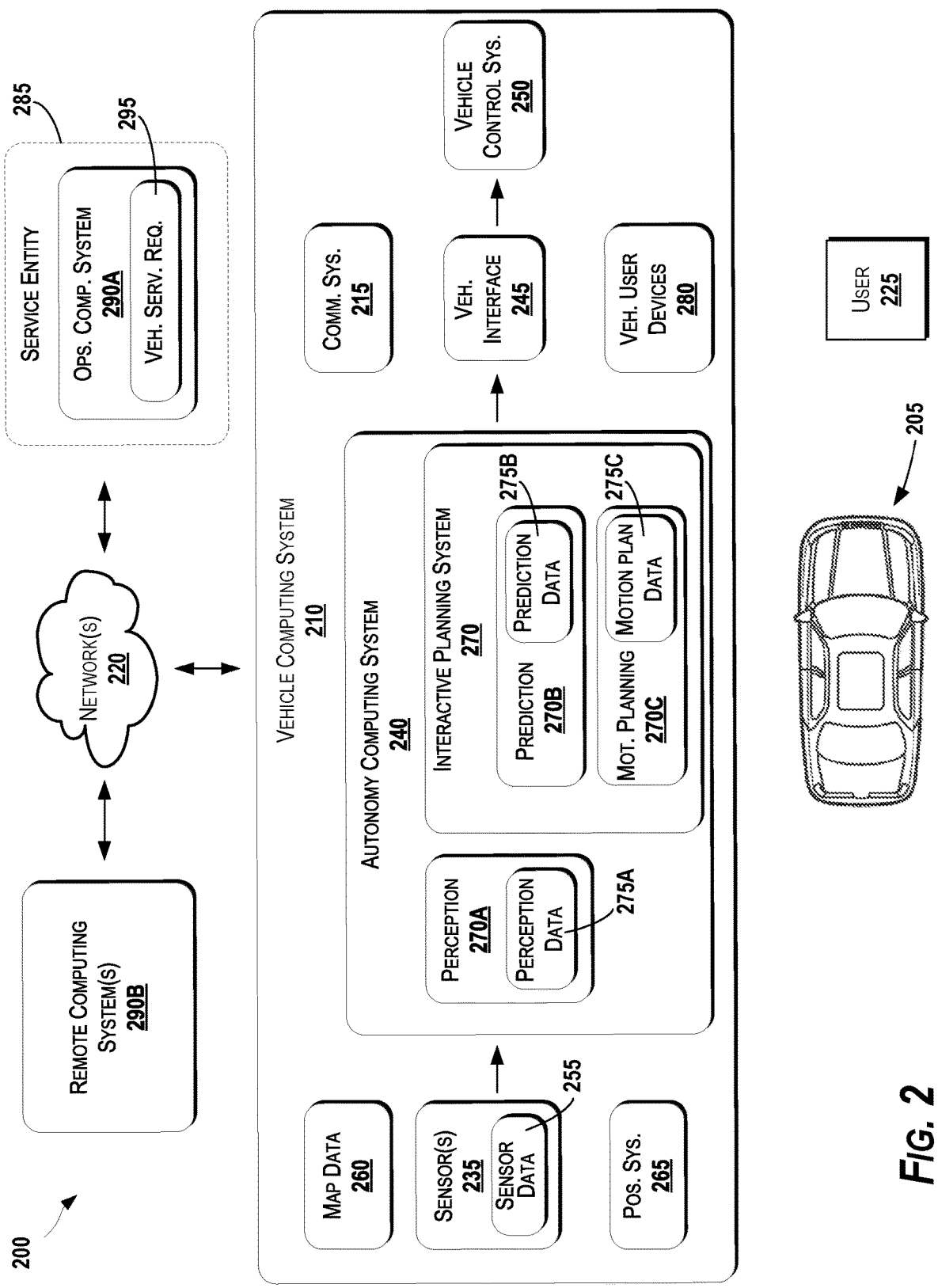
FIG. 2 is a block diagram of a system, according to some implementations of the present disclosure.

FIG. 2 depicts an example system overview 200 of the autonomous platform as an autonomous vehicle according to example implementations of the present disclosure. More particularly, FIG. 2 illustrates a vehicle 205 including various systems and devices configured to control the operation of the vehicle 205. For example, the vehicle 205 can include an onboard vehicle computing system 210 (e.g., located on or within the autonomous vehicle, etc.) that is configured to operate the vehicle 205. For example, the vehicle computing system 210 can represent or be an autonomous vehicle control system configured to perform the operations and functions described herein for joint prediction/planning of trajectories. Generally, the vehicle computing system 210 can obtain sensor data 255 from a sensor system 235 (e.g., sensor(s) 115, 120 of FIG. 1, etc.) onboard the vehicle 205, attempt to comprehend the vehicle's surrounding environment by performing various processing techniques on the sensor data 255, and generate an appropriate motion plan through the vehicle's surrounding environment (e.g., environment 110 of FIG. 1, etc.).

The vehicle 205 incorporating the vehicle computing system 210 can be various types of vehicles. For instance, the vehicle 205 can be an autonomous vehicle. The vehicle 205 can be a ground-based autonomous vehicle (e.g., car, truck, bus, etc.). The vehicle 205 can be an air-based autonomous vehicle (e.g., airplane, helicopter, etc.). The vehicle 205 can be a lightweight electric vehicle (e.g., bicycle, scooter, etc.). The vehicle 205 can be another type of vehicle (e.g., watercraft, etc.). The vehicle 205 can drive, navigate, operate, etc. with minimal or no interaction from a human operator (e.g., driver, pilot, etc.). In some implementations, a human operator can be omitted from the vehicle 205 (or also omitted from remote control of the vehicle 205). In some implementations, a human operator can be included in the vehicle 205.

The vehicle 205 can be configured to operate in a plurality of operating modes. The vehicle 205 can be configured to operate in a fully autonomous (e.g., self-driving, etc.) operating mode in which the vehicle 205 is controllable without user input (e.g., can drive and navigate with no input from a human operator present in the vehicle 205 or remote from the vehicle 205, etc.). The vehicle 205 can operate in a semi-autonomous operating mode in which the vehicle 205 can operate with some input from a human operator present in the vehicle 205 (or a human operator that is remote from the vehicle 205). The vehicle 205 can enter into a manual operating mode in which the vehicle 205 is fully controllable by a human operator (e.g., human driver, pilot, etc.) and can be prohibited or disabled (e.g., temporary, permanently, etc.) from performing autonomous navigation (e.g., autonomous driving, flying, etc.). The vehicle 205 can be configured to operate in other modes such as, for example, park or sleep modes (e.g., for use between tasks/actions such as waiting to provide a vehicle service, recharging, etc.). In some implementations, the vehicle 205 can implement vehicle operating assistance technology (e.g., collision mitigation system, power assist steering, etc.), for example, to help assist the human operator of the vehicle 205 (e.g., while in a manual mode, etc.).

To help maintain and switch between operating modes, the vehicle computing system 210 can store data indicative of the operating modes of the vehicle 205 in a memory onboard the vehicle 205. For example, the operating modes can be defined by an operating mode data structure (e.g., rule, list, table, etc.) that indicates one or more operating parameters for the vehicle 205, while in the particular operating mode. For example, an operating mode data structure can indicate that the vehicle 205 is to autonomously plan its motion when in the fully autonomous operating mode. The vehicle computing system 210 can access the memory when implementing an operating mode.

The operating mode of the vehicle 205 can be adjusted in a variety of manners. For example, the operating mode of the vehicle 205 can be selected remotely, off-board the vehicle 205. For example, a remote computing system (e.g., of a vehicle provider, fleet manager, or service entity associated with the vehicle 205, etc.) can communicate data to the vehicle 205 instructing the vehicle 205 to enter into, exit from, maintain, etc. an operating mode. By way of example, such data can instruct the vehicle 205 to enter into the fully autonomous operating mode.

In some implementations, the operating mode of the vehicle 205 can be set onboard or near the vehicle 205. For example, the vehicle computing system 210 can automatically determine when and where the vehicle 205 is to enter, change, maintain, etc. a particular operating mode (e.g., without user input, etc.). Additionally, or alternatively, the operating mode of the vehicle 205 can be manually selected through one or more interfaces located onboard the vehicle 205 (e.g., key switch, button, etc.) or associated with a computing device within a certain distance to the vehicle 205 (e.g., a tablet operated by authorized personnel located near the vehicle 205 and connected by wire or within a wireless communication range, etc.). In some implementations, the operating mode of the vehicle 205 can be adjusted by manipulating a series of interfaces in a particular order to cause the vehicle 205 to enter into a particular operating mode.

The operations computing system 290A can include multiple components for performing various operations and functions. For example, the operations computing system 290A can be configured to monitor and communicate with the vehicle 205 or its users. This can include overseeing the vehicle 205 and/or coordinating a vehicle service provided by the vehicle 205 (e.g., cargo delivery service, passenger transport, etc.). To do so, the operations computing system 290A can communicate with the one or more remote computing system(s) 290B or the vehicle 205 through one or more communications network(s) including the communications network(s) 220. The communications network(s) 220 can send or receive signals (e.g., electronic signals, etc.) or data (e.g., data from a computing device, etc.) and include any combination of various wired (e.g., twisted pair cable, etc.) or wireless communication mechanisms (e.g., cellular, wireless, satellite, microwave, and radio frequency, etc.) or any desired network topology (or topologies). For example, the communications network 220 can include a local area network (e.g., intranet, etc.), wide area network (e.g., the Internet, etc.), wireless LAN network (e.g., through Wi-Fi, etc.), cellular network, a SATCOM network, VHF network, a HF network, a WiMAX based network, or any other suitable communications network (or combination thereof) for transmitting data to or from the vehicle 205.

Each of the one or more remote computing system(s) 290B or the operations computing system 290A can include one or more processors and one or more memory devices. The one or more memory devices can be used to store instructions that when executed by the one or more processors of the one or more remote computing system(s) 290B or operations computing system 290A cause the one or more processors to perform operations or functions including operations or functions associated with the vehicle 205 including sending or receiving data or signals to or from the vehicle 205, monitoring the state of the vehicle 205, or controlling the vehicle 205. The one or more remote computing system(s) 290B can communicate (e.g., exchange data or signals, etc.) with one or more devices including the operations computing system 290A and the vehicle 205 through the communications network(s) 220.

The one or more remote computing system(s) 290B can include one or more computing devices such as, for example, one or more devices associated with a service entity (e.g., coordinating and managing a vehicle service), one or more operator devices associated with one or more vehicle providers (e.g., providing vehicles for use by the service entity, etc.), user devices associated with one or more vehicle passengers, developer devices associated with one or more vehicle developers (e.g., a laptop/tablet computer configured to access computer software of the vehicle computing system 210, etc.), or other devices. One or more of the devices can receive input instructions from a user or exchange signals or data with an item or other computing device or computing system (e.g., the operations computing system 290A, etc.). Further, the one or more remote computing system(s) 290B can be used to determine or modify one or more states of the vehicle 205 including a location (e.g., a latitude and longitude, etc.), a velocity, an acceleration, a trajectory, a heading, or a path of the vehicle 205 based in part on signals or data exchanged with the vehicle 205. In some implementations, the operations computing system 290A can include the one or more remote computing system(s) 290B.

The vehicle computing system 210 can include one or more computing devices located onboard the autonomous vehicle 205. For example, the computing device(s) can be located on or within the autonomous vehicle 205. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 205 (e.g., its computing system, one or more processors, etc.) to perform operations and functions, such as those described herein for collecting and processing sensor data, performing autonomy functions, predicting object trajectories and generating vehicle motion trajectories (e.g., using a joint prediction/planning framework according to example aspects of the present disclosure), controlling the vehicle 205, communicating with other computing systems, etc.

The vehicle 205 can include a communications system 215 configured to allow the vehicle computing system 210 (and its computing device(s)) to communicate with other computing devices. The communications system 215 can include any suitable components for interfacing with one or more network(s) 220, including, for example, transmitters, receivers, ports, controllers, antennas, or other suitable components that can help facilitate communication. In some implementations, the communications system 215 can include a plurality of components (e.g., antennas, transmitters, or receivers, etc.) that allow it to implement and utilize multiple-input, multiple-output (MIMO) technology and communication techniques. The vehicle computing system 210 can use the communications system 215 to communicate with one or more computing devices that are remote from the vehicle 205 over the communication network(s) 220 (e.g., through one or more wireless signal connections, etc.).

As shown in FIG. 2, the vehicle computing system 210 can include the one or more sensors 235, the autonomy computing system 240, the vehicle interface 245, the one or more vehicle control systems 250, and other systems, as described herein. One or more of these systems can be configured to communicate with one another through one or more communication channels. The communication channel(s) can include one or more data buses (e.g., controller area network (CAN), etc.), on-board diagnostics connector (e.g., OBD-II, etc.), or a combination of wired or wireless communication links. The onboard systems can send or receive data, messages, signals, etc. amongst one another through the communication channel(s).

In some implementations, the sensor(s) 235 can include one or more LIDAR sensor(s). The sensor(s) 235 can be configured to generate point data descriptive of a portion of a three hundred and sixty degree view of the surrounding environment. The point data can be three-dimensional LIDAR point cloud data. In some implementations, one or more sensors 235 for capturing depth information can be fixed to a rotational device in order to rotate the sensor(s) about an axis. The sensor(s) 235 can be rotated about the axis while capturing data in interval sector packets descriptive of different portions of a three hundred and sixty degree view of a surrounding environment of the autonomous vehicle 205. In some implementations, one or more sensors 235 for capturing depth information can be solid state.

In some implementations, the sensor(s) 235 can include at least two different types of sensor(s). For instance, the sensor(s) 235 can include at least one first sensor (e.g., the first sensor(s) 115, etc.) and at least one second sensor (e.g., the second sensor(s) 120, etc.). The at least one first sensor can be a different type of sensor than the at least one second sensor. For example, the at least one first sensor can include one or more image capturing device(s) (e.g., one or more cameras, RGB cameras, etc.). In addition, or alternatively, the at least one second sensor can include one or more depth capturing device(s) (e.g., LIDAR sensor, etc.). The at least two different types of sensor(s) can obtain multi-modal sensor data indicative of one or more static or dynamic objects within an environment of the autonomous vehicle 205.

The sensor(s) 235 can be configured to acquire sensor data 255. The sensor(s) 235 can be external sensors configured to acquire external sensor data. This can include sensor data associated with the surrounding environment of the vehicle 205. The surrounding environment of the vehicle 205 can include/be represented in the field of view of the sensor(s) 235. For instance, the sensor(s) 235 can acquire image or other data of the environment outside of the vehicle 205 and within a range or field of view of one or more of the sensor(s) 235. This can include different types of sensor data acquired by the sensor(s) 235 such as, for example, data from one or more LIDAR systems, one or more RADAR systems, one or more cameras (e.g., visible spectrum cameras, infrared cameras, etc.), one or more motion sensors, one or more audio sensors (e.g., microphones, etc.), or other types of imaging capture devices or sensors. The sensor data 255 can include image data (e.g., 2D camera data, video data, etc.), RADAR data, LIDAR data (e.g., 3D point cloud data, etc.), audio data, or other types of data. The one or more sensors can be located on various parts of the vehicle 205 including a front side, rear side, left side, right side, top, or bottom of the vehicle 205. The vehicle 205 can also include other sensors configured to acquire data associated with the vehicle 205 itself. For example, the vehicle 205 can include inertial measurement unit(s), wheel odometry devices, or other sensors.

The sensor data 255 can be indicative of one or more objects within the surrounding environment of the vehicle 205. The object(s) can include, for example, vehicles, pedestrians, bicycles, or other objects. The object(s) can be located in front of, to the rear of, to the side of, above, below the vehicle 205, etc. The sensor data 255 can be indicative of locations associated with the object(s) within the surrounding environment of the vehicle 205 at one or more times. The object(s) can be static objects (e.g., not in motion, etc.) or dynamic objects, such as other objects (e.g., in motion or likely to be in motion, etc.) in the vehicle's environment, such as people, animals, machines, vehicles, etc. The sensor data 255 can also be indicative of the static background of the environment. The sensor(s) 235 can provide the sensor data 255 to the autonomy computing system 240, the remote computing device(s) 290B, or the operations computing system 290A.

In addition to the sensor data 255, the autonomy computing system 240 can obtain map data 260. The map data 260 can provide detailed information about the surrounding environment of the vehicle 205 or the geographic area in which the vehicle 205 was, is, or will be located. For example, the map data 260 can provide information regarding: the identity and location of different roadways, road segments, buildings, or other items or objects (e.g., lampposts, crosswalks or curb, etc.); the location and directions of traffic lanes (e.g., the location and direction of a parking lane, a turning lane, a bicycle lane, or other lanes within a particular roadway or other travel way or one or more boundary markings associated therewith, etc.); traffic control data (e.g., the location and instructions of signage, traffic lights, or other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); or any other map data that provides information that assists the vehicle computing system 210 in processing, analyzing, and perceiving its surrounding environment and its relationship thereto. In some implementations, the map data 260 can include high definition map data. In some implementations, the map data 260 can include sparse map data indicative of a limited number of environmental features (e.g., lane boundaries, etc.). In some implementations, the map data can be limited to geographic area(s) or operating domains in which the vehicle 205 (or autonomous vehicles generally) can travel (e.g., due to legal/regulatory constraints, autonomy capabilities, or other factors, etc.).

The vehicle 205 can include a positioning system 265. The positioning system 265 can determine a current position of the vehicle 205. This can help the vehicle 205 localize itself within its environment. The positioning system 265 can be any device or circuitry for analyzing the position of the vehicle 205. For example, the positioning system 265 can determine position by using one or more of inertial sensors (e.g., inertial measurement unit(s), etc.), a satellite positioning system, based on IP address, by using triangulation or proximity to network access points or other network components (e.g., cellular towers, WiFi access points, etc.) or other suitable techniques. The position of the vehicle 205 can be used by various systems of the vehicle computing system 210 or provided to a remote computing system. For example, the map data 260 can provide the vehicle 205 relative positions of the elements of a surrounding environment of the vehicle 205. The vehicle 205 can identify its position within the surrounding environment (e.g., across six axes, etc.) based at least in part on the map data 260. For example, the vehicle computing system 210 can process the sensor data 255 (e.g., LIDAR data, camera data, etc.) to match it to a map of the surrounding environment to get an understanding of the vehicle's position within that environment. Data indicative of the vehicle's position can be stored, communicated to, or otherwise obtained by the autonomy computing system 240.

The autonomy computing system 240 can perform various functions for autonomously operating the vehicle 205. For example, the autonomy computing system 240 can perform the following functions: perception 270A, prediction/forecasting 270B, and motion planning 270C. For example, the autonomy computing system 240 can obtain the sensor data 255 through the sensor(s) 235, process the sensor data 255 (or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction/forecasting system, a motion planning system, or other systems that cooperate to perceive the surrounding environment of the vehicle 205 and determine a motion plan for controlling the motion of the vehicle 205 accordingly. In some implementations, one or more of the perception, prediction, or motion planning functions 270A, 270B, 270C can be performed by (or combined into) the same system or through shared computing resources. In some implementations, one or more of these functions can be performed through different sub-systems. As further described herein, the autonomy computing system 240 can communicate with the one or more vehicle control systems 250 to operate the vehicle 205 according to the motion plan (e.g., through the vehicle interface 245, etc.).

For example, in some implementations, the autonomy computing system 240 can contain an interactive planning system 270 for joint planning/prediction according to example aspects of the present disclosure. Interactive planning system 270 can be included as an addition or complement to one or more traditional planning system(s). For instance, in some implementations, the interactive planning system 270 can implement prediction and motion planning functions 270B and 270C, while optionally one or more other planning systems can implement other prediction and motion planning functions (e.g., noninteractive functions). In some implementations, prediction and motion planning functions 270B and 270C can be implemented jointly to provide for interactive motion planning (e.g., motion planning for vehicle 205 that accounts for predicted interactions of other objects 130 with the motion plans, etc.). In some implementations, however, interactive planning system 270 can be configured to provide noninteractive planning (e.g., optionally in addition to interactive planning). In some implementations, interactive planning system 270 can be configured with variable interactivity, such that the output(s) of interactive planning system 270 can be adjusted to fully interactive planning, fully noninteractive planning, and one or more configurations therebetween (e.g., interactive planning aspects in a weighted combination with noninteractive planning aspects, etc.).

The vehicle computing system 210 (e.g., the autonomy computing system 240, etc.) can identify one or more objects that are within the surrounding environment of the vehicle 205 based at least in part on the sensor data 255 or the map data 260. The objects perceived within the surrounding environment can be those within the field of view of the sensor(s) 235 or predicted to be occluded from the sensor(s) 235. This can include object(s) not in motion or not predicted to move (static objects) or object(s) in motion or predicted to be in motion (dynamic objects/actors). The vehicle computing system 210 (e.g., performing the perception function 270A, using a perception system, etc.) can process the sensor data 255, the map data 260, etc. to obtain perception data 275A. The vehicle computing system 210 can generate perception data 275A that is indicative of one or more states (e.g., current or past state(s), etc.) of one or more objects that are within a surrounding environment of the vehicle 205. For example, the perception data 275A for each object can describe (e.g., for a given time, time period, etc.) an estimate of the object's: current or past location (also referred to as position); current or past speed/velocity; current or past acceleration; current or past heading; current or past orientation; size/footprint (e.g., as represented by a bounding shape, object highlighting, etc.); class (e.g., pedestrian class vs. vehicle class vs. bicycle class, etc.), the uncertainties associated therewith, or other state information. The vehicle computing system 210 can utilize one or more algorithms or machine-learned model(s) that are configured to identify object(s) based at least in part on the sensor data 255. This can include, for example, one or more neural networks trained to identify object(s) within the surrounding environment of the vehicle 205 and the state data associated therewith. The perception data 275A can be utilized for the prediction function 270B of the autonomy computing system 240.

The vehicle computing system 210 can be configured to predict a motion of the object(s) within the surrounding environment of the vehicle 205. For instance, the vehicle computing system 210 can generate prediction data 275B associated with such object(s). The prediction data 275B can be indicative of one or more predicted future locations of each respective object. For example, the prediction function 270B can determine a predicted motion trajectory along which a respective object is predicted to travel over time. A predicted motion trajectory can be indicative of a path that the object is predicted to traverse and an associated timing with which the object is predicted to travel along the path. The predicted path can include or be made up of a plurality of waypoints. In some implementations, the prediction data 275B can be indicative of the speed or acceleration at which the respective object is predicted to travel along its associated predicted motion trajectory. The vehicle computing system 210 can utilize one or more algorithms and one or more machine-learned model(s) that are configured to predict the future motion of object(s) based at least in part on the sensor data 255, the perception data 275A, map data 260, or other data. This can include, for example, one or more neural networks trained to predict the motion of the object(s) within the surrounding environment of the vehicle 205 based at least in part on the past or current state(s) of those objects as well as the environment in which the objects are located (e.g., the lane boundary in which it is travelling, etc.). The prediction data 275B can be utilized for the motion planning function 270C of the autonomy computing system 240, such as in a joint planning/prediction technique implemented by interactive planning system 270.

The vehicle computing system 210 can determine a motion plan for the vehicle 205 based at least in part on the perception data 275A, the prediction data 275B, or other data. For example, the vehicle computing system 210 can generate motion planning data 275C indicative of a motion plan. The motion plan can include vehicle actions (e.g., speed(s), acceleration(s), other actions, etc.) with respect to one or more of the objects within the surrounding environment of the vehicle 205 as well as the objects' predicted movements. The motion plan can include one or more vehicle motion trajectories that indicate a path for the vehicle 205 to follow. A vehicle motion trajectory can be of a certain length or time range. A vehicle motion trajectory can be defined by one or more waypoints (with associated coordinates). The waypoint(s) can be future location(s) for the vehicle 205. The planned vehicle motion trajectories can indicate the path the vehicle 205 is to follow as it traverses a route from one location to another. Thus, the vehicle computing system 210 can take into account a route/route data when performing the motion planning function 270C.

The vehicle computing system 210 can implement (e.g., via interactive planning system 270) an optimization algorithm, machine-learned model, etc. that considers cost data associated with a vehicle action as well as other objectives (e.g., cost functions, such as cost functions based at least in part on dynamic objects, speed limits, traffic lights, etc.), if any, to determine optimized variables that make up the motion plan. The vehicle computing system 210 can determine that the vehicle 205 can perform a certain action (e.g., pass an object, etc.) without increasing the potential risk to the vehicle 205 or violating any traffic laws (e.g., speed limits, lane boundaries, signage, etc.). For instance, the vehicle computing system 210 can evaluate the predicted motion trajectories of one or more objects during its cost data analysis to help determine an optimized vehicle trajectory through the surrounding environment. The motion planning function 270C can generate cost data associated with such trajectories. In some implementations, one or more of the predicted motion trajectories or perceived objects may not ultimately change the motion of the vehicle 205 (e.g., due to an overriding factor, etc.). In some implementations, the motion plan can define the vehicle's motion such that the vehicle 205 avoids the object(s), reduces speed to give more leeway to one or more of the object(s), proceeds cautiously, performs a stopping action, passes an object, queues behind/in front of an object, etc.

The vehicle computing system 210 can be configured to continuously update the vehicle's motion plan and corresponding planned vehicle motion trajectories. For example, in some implementations, the vehicle computing system 210 can generate new motion planning data 275C (e.g., motion plan(s)) for the vehicle 205 (e.g., multiple times per second, etc.). Each new motion plan can describe a motion of the vehicle 205 over the next planning period (e.g., waypoint(s)/locations(s) over the next several seconds, etc.). Moreover, a motion plan can include a planned vehicle motion trajectory. The motion trajectory can be indicative of the future planned location(s), waypoint(s), heading, velocity, acceleration, etc. In some implementations, the vehicle computing system 210 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 205.

The vehicle computing system 210 can cause the vehicle 205 to initiate a motion control in accordance with at least a portion of the motion planning data 275C. A motion control can be an operation, action, etc. that is associated with controlling the motion of the vehicle 205. For instance, the motion planning data 275C can be provided to the vehicle control system(s) 250 of the vehicle 205. The vehicle control system(s) 250 can be associated with a vehicle interface 245 that is configured to implement a motion plan. The vehicle interface 245 can serve as an interface/conduit between the autonomy computing system 240 and the vehicle control systems 250 of the vehicle 205 and any electrical/mechanical controllers associated therewith. The vehicle interface 245 can, for example, translate a motion plan into instructions for the appropriate vehicle control component (e.g., acceleration control, brake control, steering control, etc.). By way of example, the vehicle interface 245 can translate a determined motion plan into instructions to adjust the steering of the vehicle 205 by a certain number of degrees, apply a certain magnitude of braking force, increase/decrease speed, etc. The vehicle interface 245 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 205 to autonomously travel within the vehicle's surrounding environment.

The vehicle computing system 210 can store other types of data. For example, an indication, record, or other data indicative of the state of the vehicle (e.g., its location, motion trajectory, health information, etc.), the state of one or more users (e.g., passengers, operators, etc.) of the vehicle, or the state of an environment including one or more objects (e.g., the physical dimensions or appearance of the one or more objects, locations, predicted motion, etc.) can be stored locally in one or more memory devices of the vehicle 205. Additionally, the vehicle 205 can communicate data indicative of the state of the vehicle, the state of one or more passengers of the vehicle, or the state of an environment to a computing system that is remote from the vehicle 205, which can store such information in one or more memories remote from the vehicle 205. Moreover, the vehicle 205 can provide any of the data created or store onboard the vehicle 205 to another vehicle.

The vehicle computing system 210 can include or otherwise be in communication with the one or more vehicle user devices 280. For example, the vehicle computing system 210 can include, or otherwise be in communication with, one or more user devices with one or more display devices located onboard the vehicle 205. A display device (e.g., screen of a tablet, laptop, smartphone, etc.) can be viewable by a user of the vehicle 205 that is located in the front of the vehicle 205 (e.g., driver's seat, front passenger seat, etc.). Additionally, or alternatively, a display device can be viewable by a user of the vehicle 205 that is located in the rear of the vehicle 205 (e.g., a back passenger seat, etc.). The user device(s) associated with the display devices can be any type of user device such as, for example, a tablet, mobile phone, laptop, etc. The vehicle user device(s) 280 can be configured to function as human-machine interfaces. For example, the vehicle user device(s) 280 can be configured to obtain user input, which can then be utilized by the vehicle computing system 210 or another computing system (e.g., a remote computing system, etc.). For example, a user (e.g., a passenger for transportation service, a vehicle operator, etc.) of the vehicle 205 can provide user input to adjust a destination location of the vehicle 205. The vehicle computing system 210 or another computing system can update the destination location of the vehicle 205 and the route associated therewith to reflect the change indicated by the user input.

As described herein, with reference to the remaining figures, the autonomy computing system 240 can utilize one or more machine-learned models to perform the perception 270A, prediction 270B, or motion planning 270C functions. The machine-learned model(s) can be previously trained through one or more machine-learned techniques. The machine-learned models can be previously trained by the one or more remote computing system(s) 290B, the operations computing system 290A, or any other device (e.g., remote servers, training computing systems, etc.) remote from or onboard the vehicle 205. For example, the one or more machine-learned models can be learned by a training computing system over training data stored in a training database. The training data can include, for example, sequential sensor data indicative of an environment (and objects/features within) at different time steps. In some implementations, the training data can include a plurality of environments previously recorded by the autonomous vehicle with one or more objects, static object(s) or dynamic object(s).

To help improve the performance of an autonomous platform, such as an autonomous vehicle of FIG. 2, the technology of the present disclosure generally provides for implementing an interactive planning system 270. In particular, example aspects of the present disclosure provide for a structured deep model (e.g., a structured machine-learned model) that uses a set of learnable costs across a set of future (e.g., possible) object trajectories. In some aspects, the set of learnable costs can induce a joint probability distribution over the set of future object trajectories (e.g., a distribution of probabilities for each of the set of future object trajectories, such as a set of probabilities for each of the set of future object trajectories conditioned on the vehicle motion trajectory of the autonomous vehicle). In this manner, for example, the interactive planning system 270 can jointly predict object motion (e.g., using the probability information) and plan vehicle motion (e.g., according to the costs).

Figure 3A:
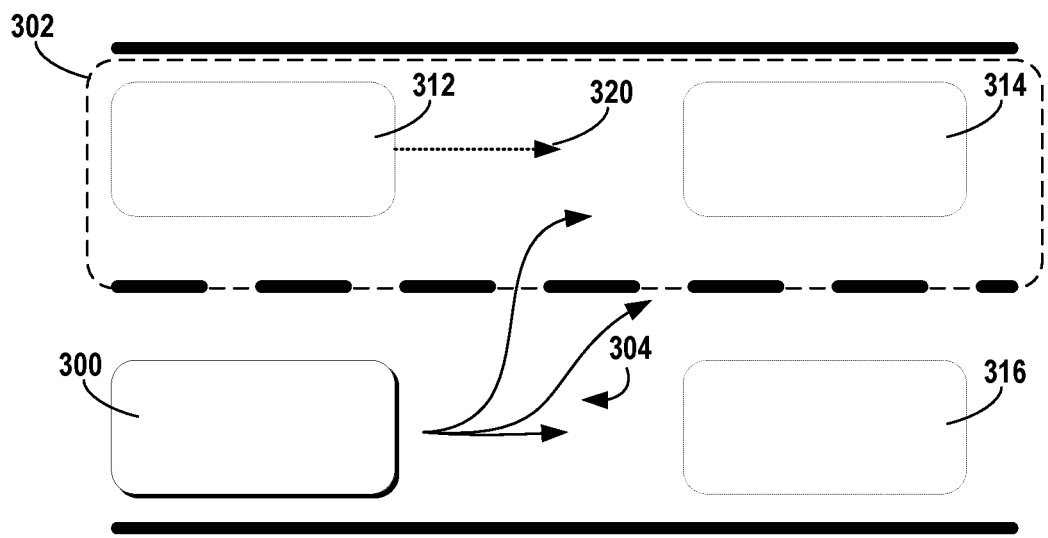
FIG. 3A illustrates aspects of a joint planning/prediction approach according to some implementations of the present disclosure.
Figure 3B:
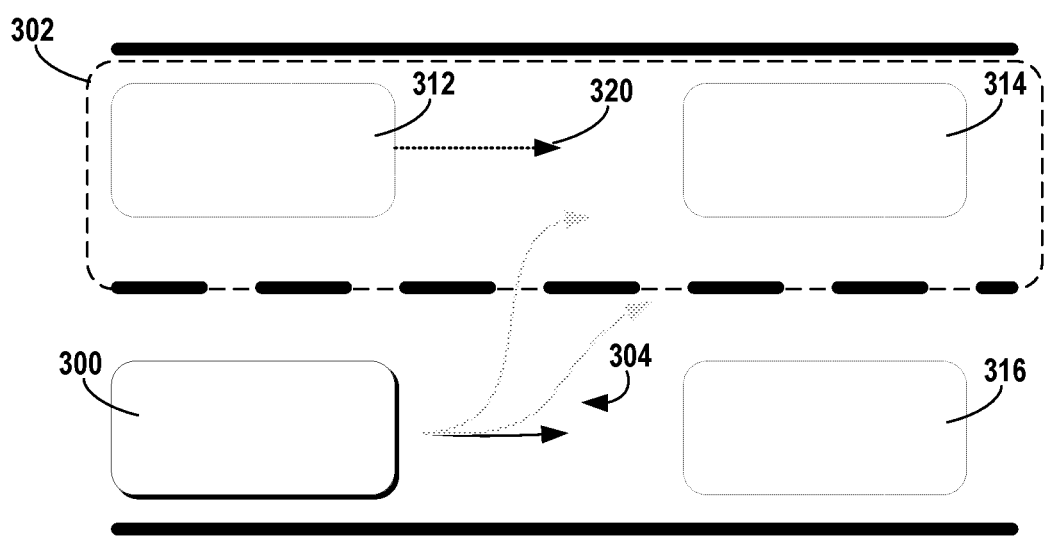
FIG. 3B illustrates aspects of a joint planning/prediction approach according to some implementations of the present disclosure.

In some implementations, an interactive planning system 270 can implement interactive planning or noninteractive planning, as well as combinations thereof. For example, FIG. 3A illustrates an ego-actor, such as autonomous vehicle 300, traversing a lane of a roadway. It might be desired for the autonomous vehicle 300 to change lanes to move into the other lane 302 (e.g., by following one or more vehicle motion trajectories 304). However, the autonomous vehicle 300 is sharing the roadway with objects 312, 314, and 316 (e.g., other actors). And it can be predicted (e.g., by prediction function 270B) that object 312 will continue moving forward in lane 302 along object trajectory 320 and maintain the same distance behind vehicle 314, which may not leave sufficient room for autonomous vehicle 300 to maneuver into lane 302 while meeting other constraints (e.g., buffer space constraints, etc.). Based on this prediction, for example, the autonomous vehicle 300 can choose one of the motion trajectories 304 that does not interfere with the object 312 on the object trajectory 320 (e.g., as illustrated in FIG. 3B).

In some scenarios, the other objects 312, 314, and 316, absent an external factor, might never move in such a way as to permit the autonomous vehicle 300 to ever obtain sufficient space (e.g., between objects 312 and 314) to change lanes. For instance, object 312 might never have any interaction with any motion of autonomous vehicle 300 (e.g., never cooperatively adapt to the motion of the autonomous vehicle 300). But in some scenarios, the object 312 might interact with a motion of the autonomous vehicle 300 in such a way as to open up space in the lane 302.

Figure 4A:
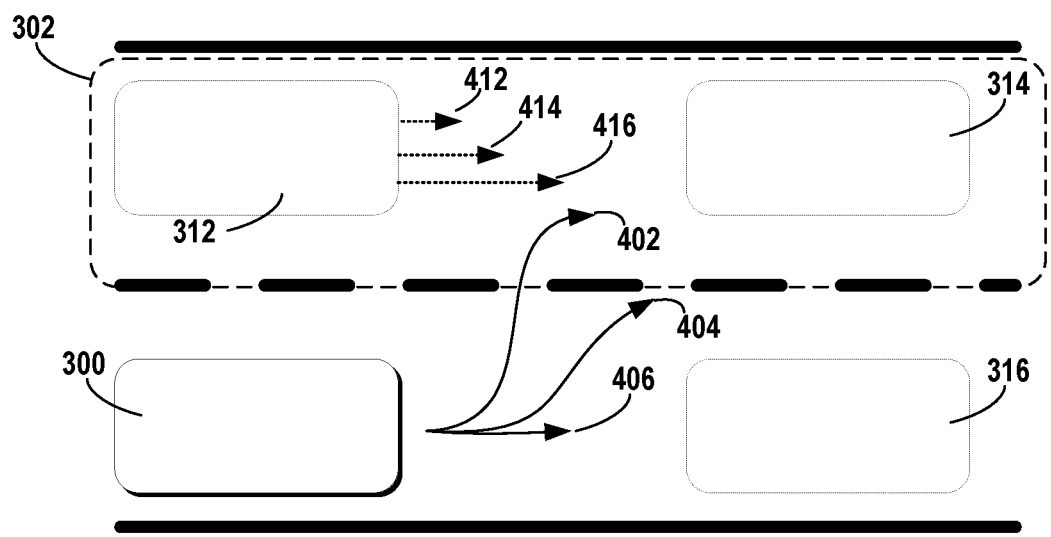
FIG. 4A illustrates aspects of a joint planning/prediction approach according to some implementations of the present disclosure.
Figure 4B:
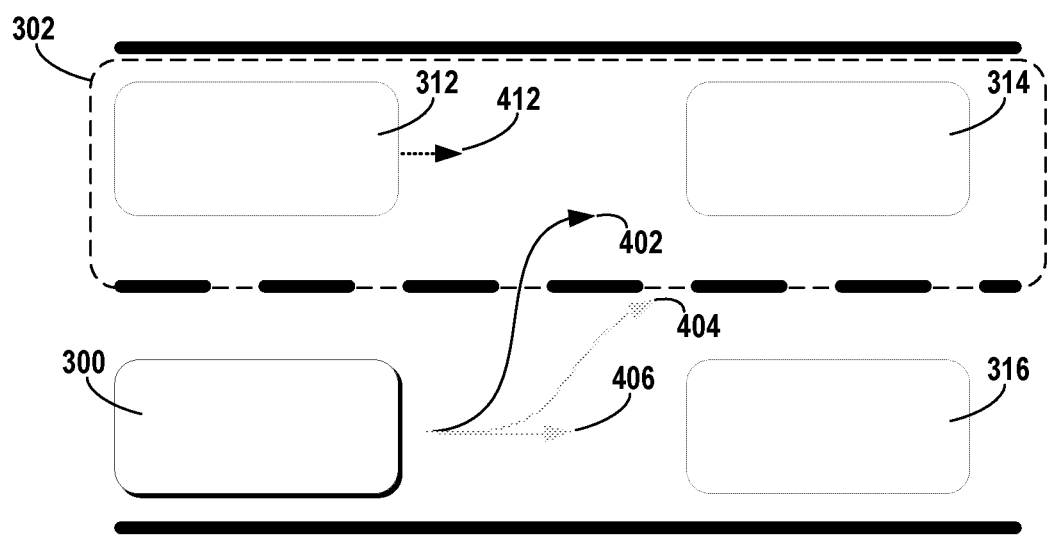
FIG. 4B illustrates aspects of a joint planning/prediction approach according to some implementations of the present disclosure.

FIGS. 4A and 4B illustrate one scenario. For instance, in various implementations, the autonomous vehicle 300 can consider at least the illustrated vehicle motion trajectories 402, 404, and 406 as potential vehicle motion trajectories. Using an interactive planning system 270, the autonomous vehicle 300 can predict a first probability that the other object 312 might traverse trajectory 412 if the autonomous vehicle 300 traverses trajectory 402. Similarly, the autonomous vehicle 300 can predict a second probability that the other object 312 might traverse trajectory 414 if the autonomous vehicle 300 traverses trajectory 404, and can predict a third probability that the other object 312 might traverse trajectory 416 if the autonomous vehicle 300 traverses trajectory 406. Based at least in part on the predicted probabilities, the autonomous vehicle 300 can determine that traversing vehicle motion trajectory 402 will be associated with the object 312 traversing a trajectory 412 that permits sufficient space for the autonomous vehicle 300 to change lanes into lane 302. In this manner, for instance, the autonomous vehicle 300 can account for the object 312's interaction with the autonomous vehicle 300's traversal of trajectory 402. By accounting for the interactions of other objects with the potential motions of the autonomous vehicle 300, the autonomous vehicle 300 can expand its set of possible trajectories to include trajectories that "nudge" or otherwise interact with other objects to achieve a goal (e.g., changing lanes, turning through traffic, merging, etc.).

Figure 5:
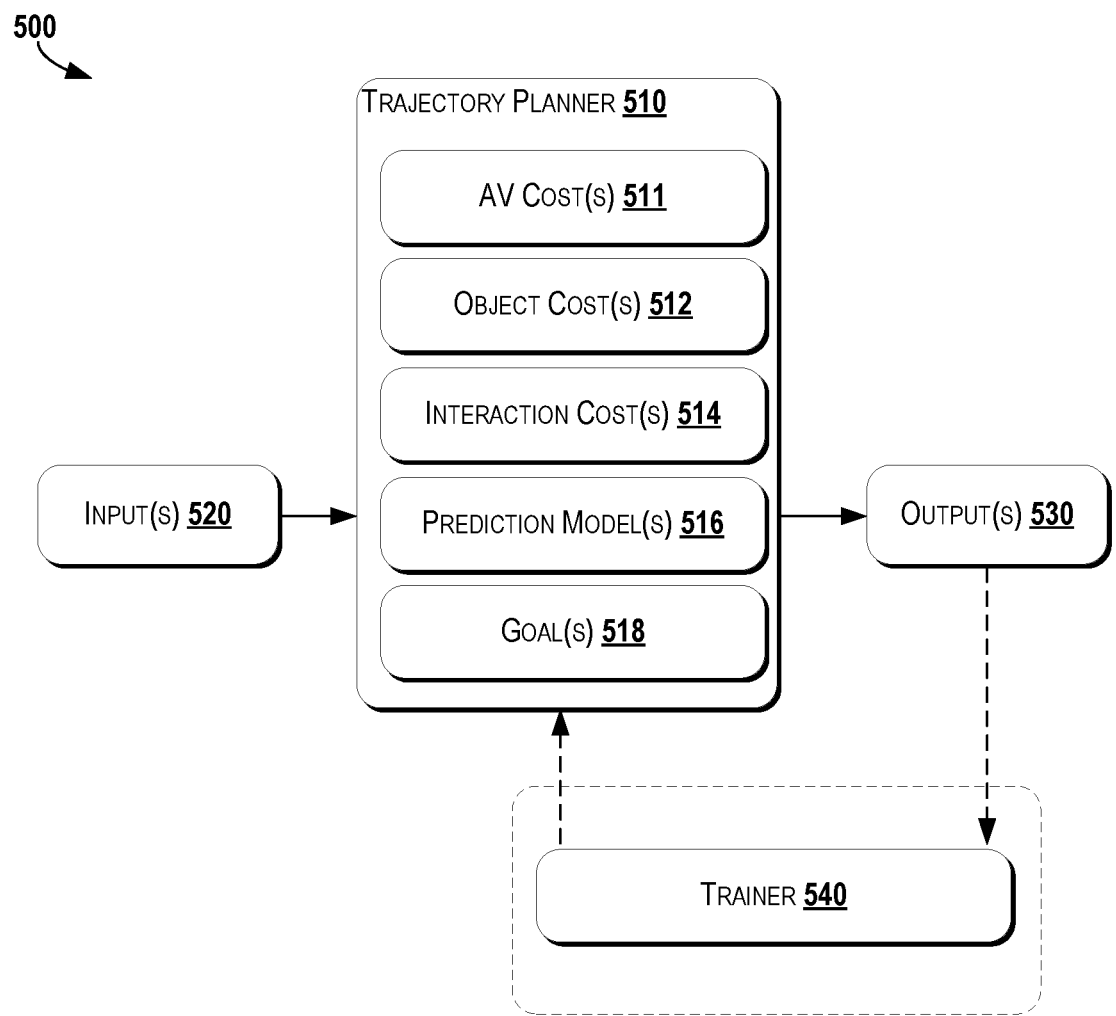
FIG. 5 is an example of a joint planning/prediction system according to some implementations of the present disclosure.

FIG. 5 depicts a diagram of an example system 500 for performing joint planning/prediction according to example aspects of the present disclosure. The example system 500 contains a trajectory planner 510 configured to accept inputs 520 and generate outputs 530. The outputs 530 can include data descriptive of one or more vehicle motion trajectories (e.g., motion plan data 275C). To generate the outputs 530, the trajectory planner 510 can implement one or more costs to determine a preferred output (e.g., a vehicle motion trajectory meeting desired criteria, etc.). The costs can include, for example, autonomous vehicle (AV) cost(s) 511, object cost(s) 512, and interaction cost(s) 514. The trajectory planner 510 can implement one or more prediction models 516 to generate one or more vehicle motion trajectories (e.g., for computation of the AV cost(s) 511) and to generate one or more object trajectories and probabilities associated with the one or more object trajectories (e.g., for computation of the object cost(s) 512 and/or the interaction cost(s) 514). The trajectory planner 510 can also implement goal(s) 518, which can be used to determine a preferred output based on the output(s) capacity to meet one or more of the goals 518.

In some implementations, the trajectory planner 510 implements a structured machine-learned framework for joint prediction/planning using AV cost(s) 511, object cost(s) 512, and interaction cost(s) 514. For example, a trajectory planner 510 can implement a structured machine-learned model for representing a value associated with a plurality of possible vehicle motion trajectories and object trajectories. For example, each of the autonomous vehicle 300, object 312, object 314, and object 316 can be respectively associated with one or more trajectories. In some implementations, each of the autonomous vehicle and any objects in the environment of the autonomous vehicle is respectively associated with a plurality of trajectories (e.g., a distribution of trajectories, such as a continuous and/or discrete distribution). In various implementations, the respective plurality of trajectories can be structured according to a priori understandings of realistic trajectories (e.g., using knowledge about how the autonomous vehicle and/or various objects can or are expected to move through space to limit a search space of trajectories to physically possible and/or other nontrivial subsets of all trajectories). In some implementations, the respective plurality of trajectories can be constructed to include, for instance, a sampled set of realistic trajectories (e.g., output by a realistic trajectory sampler). For instance, the plurality of trajectories can include (optionally continuous) trajectories composed of lines, curves (e.g., circular curves), spirals (e.g., Euler spirals), etc. In this manner, for example, the plurality of trajectories can contain a distribution of more physically realistic and human-interpretable trajectories.

For example, in some implementations, one or more of the prediction model(s) 516 can receive one or more inputs (e.g., context data, state data, etc., such as present and/or past state and/or context data measured and/or predicted for one or more objects) and generate a distribution of trajectories (e.g., object trajectories, vehicle motion trajectories, etc.). The prediction model(s) 516 can receive one or more inputs for each of the autonomous vehicle and a plurality of objects and output a tailored distribution of object trajectories for each of the plurality of objects and a tailored distribution of vehicle motion trajectories for the autonomous vehicle.

In some implementations, the AV cost(s) 511 can include costs associated with any vehicle motion trajectory for the autonomous vehicle. In some implementations, a respective AV cost 511 can encode a score or other value for traversing a trajectory for the autonomous vehicle. In some implementations, AV cost(s) 511 can be computed for a distribution of trajectories for the autonomous vehicle (e.g., the cost(s) computed for each trajectory within the distribution, etc.). In some embodiments, the AV cost(s) 511 include a learnable cost based on context data (e.g., state data) for the autonomous vehicle.

In some implementations, the object cost(s) 512 can include costs associated with any trajectory for any object in an environment. In some implementations, a respective object cost 512 can encode a score or other value for traversing a trajectory for a respective object. In some implementations, object cost(s) 512 can be computed for a distribution of trajectories for a given object (e.g., the cost(s) computed for each trajectory within the distribution, etc.). In some embodiments, the object cost(s) 512 for an object include a learnable cost based on context data (e.g., state data) for the object.

In some implementations, the object cost(s) 512 can be or otherwise include an expected value. In some implementation, the object cost(s) 512 can be or otherwise include an expectation over a distribution of trajectories for a given object conditioned on the motion of the autonomous vehicle and/or on context data for the object and/or other objects. For instance, the expectation can correspond to a probability of an object traversing one or more object trajectories if the autonomous vehicle traverses a given potential vehicle motion trajectory. In some implementations, the expectation can correspond to a probability of an object traversing one or more object trajectories if the autonomous vehicle traverses a given potential vehicle motion trajectory and if other objects traverse a particular combination of object trajectories.

In some implementations, the interaction cost(s) 514 can include costs associated with any set of two or more objects or with a pairing of the autonomous vehicle and a set of one or more objects. For instance, two or more objects, and/or a pairing of the autonomous vehicle and a set of one or more objects, can be associated with trajectories (e.g., object trajectories, vehicle motion trajectories, etc.) that have a potential interaction (e.g., overlap or proximity in time or space, such as contact or a near miss). In some embodiments, for instance, the interaction cost(s) 514 can encode a score or other value for the two or more objects, and/or a pairing of the autonomous vehicle and a set of one or more objects, respectively executing trajectories having the potential interaction. In some embodiments, the interaction cost(s) 514 includes a learnable cost, such as a learnable cost based on context and/or state data for the autonomous vehicle and/or the object(s).

In some implementations, the interaction cost(s) 514 can be or otherwise include an expected value. In some implementation, the interaction cost(s) 514 can be or otherwise include an expectation over a distribution of interacting trajectories for a given set of objects conditioned on the motion of the autonomous vehicle. For instance, the expectation can correspond to a probability of a set of objects traversing one or more object trajectories if the autonomous vehicle traverses a given potential vehicle motion trajectory.

In some implementations, the trajectory planner 510 implements one or more goals 518. The goal(s) 518 can be a cost, such as a score or other value used to influence the determination of one or more trajectories (e.g., one or more vehicle motion trajectories for the autonomous vehicle). For instance, a goal can take on different forms depending on the scenario: in the case of a turn, a goal $\mathcal{G}$ can be a target position; in the case of a lane change, $\mathcal{G}$ can be a polyline representing the centerline of the lane in continuous coordinates, etc. In some implementations, the score can include a distance (e.g., an $l_2$ distance) to a goal waypoint (e.g., a final waypoint). In some implementations (e.g., when $\mathcal{G}$ is a polyline), the score can include a projected distance (e.g., average projected distance) to $\mathcal{G}$.

In some implementations, the trajectory planner 510 can determine one or more output(s) 530 by combining a plurality of costs (e.g., AV cost(s) 511, object cost(s) 512, interaction cost(s) 514, goal(s) 518, etc.). For instance, the trajectory planner 510 can linearly combine (e.g., add, subtract, etc.) a plurality of costs/scores to obtain a total cost (e.g., for determining one or more outputs 530). In some implementations, the combination can be a weighted combination of cost(s), with weights corresponding to one or more probabilities (e.g., conditional probabilities). For example, in some implementations, a plurality of costs can be combined for one or more possible trajectories (e.g., potential vehicle motion trajectories for the autonomous vehicle, predicted object trajectories, etc.) to determine a total cost. In some implementations, a plurality of costs can be combined for each of a plurality of object trajectories for each of a plurality of objects (e.g., conditioned on each of a plurality of vehicle motion trajectories).

In some implementations, a linear combination of the cost(s) (e.g., AV cost(s) 511, object cost(s) 512, interaction cost(s) 514, etc.) can include variable weights applied to each. For example, a weight applied to the AV cost(s) 511 and/or object cost(s) 512 can emphasize influence of the individual-specific cost contribution on the combination. In some implementations, a weight applied to the interaction cost(s) can emphasize the influence of the AV-object and/or object-object interactions (e.g., contact, near misses, etc.) on the combined cost(s).

In some implementations, a total cost can correspond to or otherwise include a machine-learned expectation of a system energy. For instance, a system energy can be constructed for the autonomous vehicle and any objects in an environment. The system energy can include individual component(s) (e.g., AV-specific, object-specific components) descriptive of trajectories for the autonomous vehicle and/or each of the plurality of objects as well as interaction energy component(s). The interaction energy component(s) can be descriptive of interactions (e.g., projected interactions, likely interactions, etc.) between the autonomous vehicle and one or more objects of the plurality of objects for respective interacting trajectories of the autonomous vehicle and the one or more objects. The interaction energy component(s) can be descriptive of interactions (e.g., projected interactions, likely interactions, etc.) between two or more objects of the plurality of objects for respective interacting trajectories of the two or more objects.

The system energy can also include goal energies for the autonomous vehicle's goals. In some implementations, the trajectory planner 510 can provide for joint prediction and planning by determining an expected value of the system energy. The expectation of the system energy can provide at least in part for a probability distribution (e.g., a joint probability distribution) over the future trajectories of the plurality of objects and the vehicle motion trajectories for the autonomous vehicle. The expectation can be conditional, such as conditioned on a vehicle motion trajectory for the autonomous vehicle and/or on a set of contextual data. In some implementations, an individual component of the machine-learned expectation of a system energy can correspond to the object cost(s) 512. In some implementations, an interaction energy component can correspond to the interaction cost(s) 514.

In some implementations, the output(s) 530 can include a vehicle motion trajectory for the autonomous vehicle, and the motion vehicle trajectory can be determined according to an objective based on a plurality of costs. The objective can be based on a joint probability distribution for a plurality of object trajectories given some context data and one or more (e.g., a plurality of) potential vehicle motion trajectories. For example, in some implementations, the trajectory planner 510 can generate K trajectories, such as can be expressed by, for instance, $\mathcal{Y}=\{y_0, y_1, \ldots, y_N\}$ (e.g., 1 autonomous vehicle and N objects), where each $y_i$ can be considered a discrete random variable that can take up one of K options (e.g., corresponding to one of the K trajectories). Accordingly, in some implementations, the distribution over the trajectories can be expressed as $$p(\mathcal{Y} \mid \mathcal{X}; w) = \frac{1}{Z} \exp(-C(\mathcal{Y} \mid \mathcal{X}; w)) \qquad (1)$$

where Z is the partition function and C expresses a system energy of the future trajectories $\mathcal{Y}$ conditioned on $\mathcal{X}$ and parametrized by weights w (e.g., learnable weights w). In some implementations, contextual data can include past trajectories (e.g., for each object, for the autonomous vehicle, etc.), LiDAR sweeps, map data (e.g., high-definition map data, birds-eye view imagery, etc.), optionally in a voxelized tensor representation.

The system energy can, for example, be expressed in some implementations with an individual energy component and an interaction energy component.

$$C(\mathcal{Y} \mid \mathcal{X}; w) = \sum_{i=0}^{N} C_{traj}(y_i, \mathcal{X}; w) + \sum_{i,j} C_{inter}(y_i, y_j) \qquad (2)$$

where $C_{traj}$ can represent an individual energy component based on the trajectories $y_i$ and $C_{inter}$ can represent an interaction energy component descriptive of interactions (e.g., if any) arising from the traversal of trajectories $y_i$ and $y_j$ by the autonomous vehicle or the respective object. The summation (e.g., over 0 to N) can, in some implementations, represent a system energy which can be learned with, for example, parameters w (although not illustrated in Equation 2, $C_{inter}$ can also contain a set of learnable parameters, which can be the same as or different than w). In some implementations, the components for the autonomous vehicle can correspond to a different set of parameters than w, or to its own subset of parameters in w.

In some implementations, the individual energy component can receive a set of context data as an input. For instance, the individual energy component can be computed using one or more machine-learned models (e.g., neural networks, such as a convolutional or other neural network). In some implementations, the machine-learned models can generate one or more feature maps from the contextual data. For example, the contextual data can include rasterized data, such as a two-dimensional tensor grid (e.g., a two-dimensional tensor grid of overhead imagery of the environment), and one or more machine-learned models can generate a feature map (e.g., a spatial feature map). In some implementations, the spatial feature map generated from $\mathcal{X}$ can be combined with the input trajectories $y_i$ and processed through one or more other machine-learned layers or models to output object-specific energy values (e.g., values for summation).

In some implementations, the interaction component(s) can be computed using one or more machine-learned models. In some implementations, the interaction component(s) can be computed using one or more policies, criteria, or algorithms. For instance, an interaction component can be constructed to include a collision energy. A collision energy can include an energy value based on whether two input trajectories (e.g., $y_i$, $y_j$) might cause the respective objects and/or autonomous vehicle traversing the trajectories to come into contact. In some implementations, a collision energy can be a continuous function based on the likelihood and/or proximity to or avoidance of contact between the autonomous vehicle and an object and/or an object and another object. In some implementations, a collision energy can be a discrete function (e.g., a value of γ if contact, another value if not, such as 0, etc.). An interaction component can be constructed to include a buffer energy. A buffer energy can include an energy value based on whether the autonomous vehicle and/or objects respectively traversing two input trajectories (e.g., $y_i$, $y_j$) pass within a given buffer (e.g., within a given proximity threshold, etc.). In some implementations, a buffer energy can be a continuous or piecewise continuous function based on the likelihood and/or amount of a violation of the given buffer distance. For instance, a buffer energy can be expressed as the amount of distance in violation of the buffer (e.g., the distance past the set threshold, the square of the distance, etc.). In some implementations, a buffer energy can be a discrete function (e.g., a value of γ if a violation, another value if not, such as 0, etc.). The buffer distance can be evaluated, in some implementations, based on a distance from a bounding box of the autonomous vehicle and/or an object. In some implementations, the distance can be evaluated based on a distance from the center point of the autonomous vehicle or an object to the polygon of another object (e.g., minimal point-to-polygon distance).

In some implementations, an expectation of the system energy can be used as an objective for determining a vehicle motion trajectory for the autonomous vehicle that minimizes the expected value of the system energy. For instance, in some implementations, an objective for the trajectory planner 510 can be expressed as $$y^*_0 = \mathrm{argmin}_{y_0} f(\, \mathcal{Y}|\chi; w) \quad (3)$$

where $y^*_0$ is a vehicle motion trajectory determined for the autonomous vehicle by the trajectory planner 510 and $$f(\,\mathcal{Y}|\chi;w) = \mathbb{E}_{\,\mathcal{Y}_r \sim \mathcal{Y}_r|y_0,\chi;w)}[C(\,\mathcal{Y}|\chi;w)] \quad (4)$$

where $\mathcal{Y}_r \sim (\,\mathcal{Y}|y_0, \chi; w)$ describes the future distribution of the objects conditioned on the one or more potential trajectories $y_0$ for the autonomous vehicle (e.g., $\mathcal{Y}_r$ indicating the trajectories for the objects). The expectation of Equation 4 can be expressed in component form as $$C_{traj}(y_i, \mathcal{X}; w) + \mathbb{E}_{y_r \sim p(y_r|y_0,\mathcal{X};w)} \left[ \sum_{i=1}^{N} C_{inter}(y_0, y_i) + \sum_{i=1}^{N} C_{traj}(y_i, \mathcal{X}; w) + \sum_{i=1,j=1}^{N,N} C_{inter}(y_i, y_j) \right] \quad (5)$$

where the autonomous vehicle individual energy component is expressed outside the expectation (e.g., because the trajectory planner 510 determines the vehicle motion trajectory—and thus the actual executed energy value—for the autonomous vehicle, but does not control the plurality of objects).

The output(s) 530 can include a selected trajectory for traversal by the autonomous vehicle. In this manner, for instance, a planning objective implemented by trajectory planner 510 can jointly provide for interactive planning and prediction, by planning a trajectory for the autonomous vehicle (e.g., $y^*_0$) based on a system energy that accounts for the expected interactions of objects with the selected trajectory $y^*_0$.

In some implementations, the selected trajectory can be further processed (e.g., by a vehicle interface 245, etc.) for implementation by the autonomous vehicle as a motion plan. In some implementations, the selected trajectory can be accessed by trainer 540 for training one or more machine-learned components of the trajectory planner 510. For instance, one or more parameters (e.g., parameters w) can be updated by the trainer 540 based at least in part on the selected trajectory of the output(s) 530 (e.g., in comparison with a reference, such as a ground truth reference). In some implementations, the trainer 540 can determine one or more losses for updating the trajectory planner 510. The losses can include, for example, a comparison between one or more reference datasets descriptive of the motions through an environment of an autonomous vehicle and objects in an environment, and an output 530 of the trajectory planner 510 (e.g., an output selected trajectory for the autonomous vehicle, one or more probabilities of the object trajectories, etc.).

In some implementations, the trainer 540 is configured to update the trajectory planner 510 (e.g., one or more machine-learned components of the planner 510, such as the AV cost(s) 511, object costs 512, the interaction costs 514, the energies associated therewith, etc.) to induce both a desired vehicle motion trajectory for the autonomous vehicle and desired probabilities for the object behaviors. Since the machine-learned expectation of the system energy can induce a probability distribution over the trajectories for the plurality of objects, in some implementations, a loss over a predictive distribution and the reference trajectories can provide for learning set of costs for joint interactive planning/prediction. In some implementations, a cross-entropy loss can be used. In some implementations, the loss can include an individual loss component and an interaction loss component. For instance, in some implementations, the loss can include for each component a value based on the probability based on the expectation (e.g., as in Equation 1) for a respective set of trajectories. For example, the loss can include a log loss log $p(y_i, \chi; w)$. In some implementations, the loss is counted only for those trajectories $y_i$ that diverge from reference trajectories $y_{g.t.}$. In some implementations, the loss is counted only for those trajectories $y_i$ that diverge from reference trajectories $y_{g.t.}$ by a specified amount. For instance, the loss can be determined over a subset of the plurality of trajectories for a respective object (or, e.g., for the autonomous vehicle), where the subset is configured to exclude one or more of the predicted trajectories for that respective object (or the autonomous vehicle) that are within a tolerance distance of a corresponding reference trajectory. In some implementations, for instance, trajectories within the tolerance distance can be considered a reference equivalent (e.g., close enough, such as still within the same lane or other course of travel as the reference, such as within an inconsequential variation from a reference path along a travel way, etc.). In this manner, for example, such reference equivalents might not be penalized by the trainer 540.

Figure 6A:
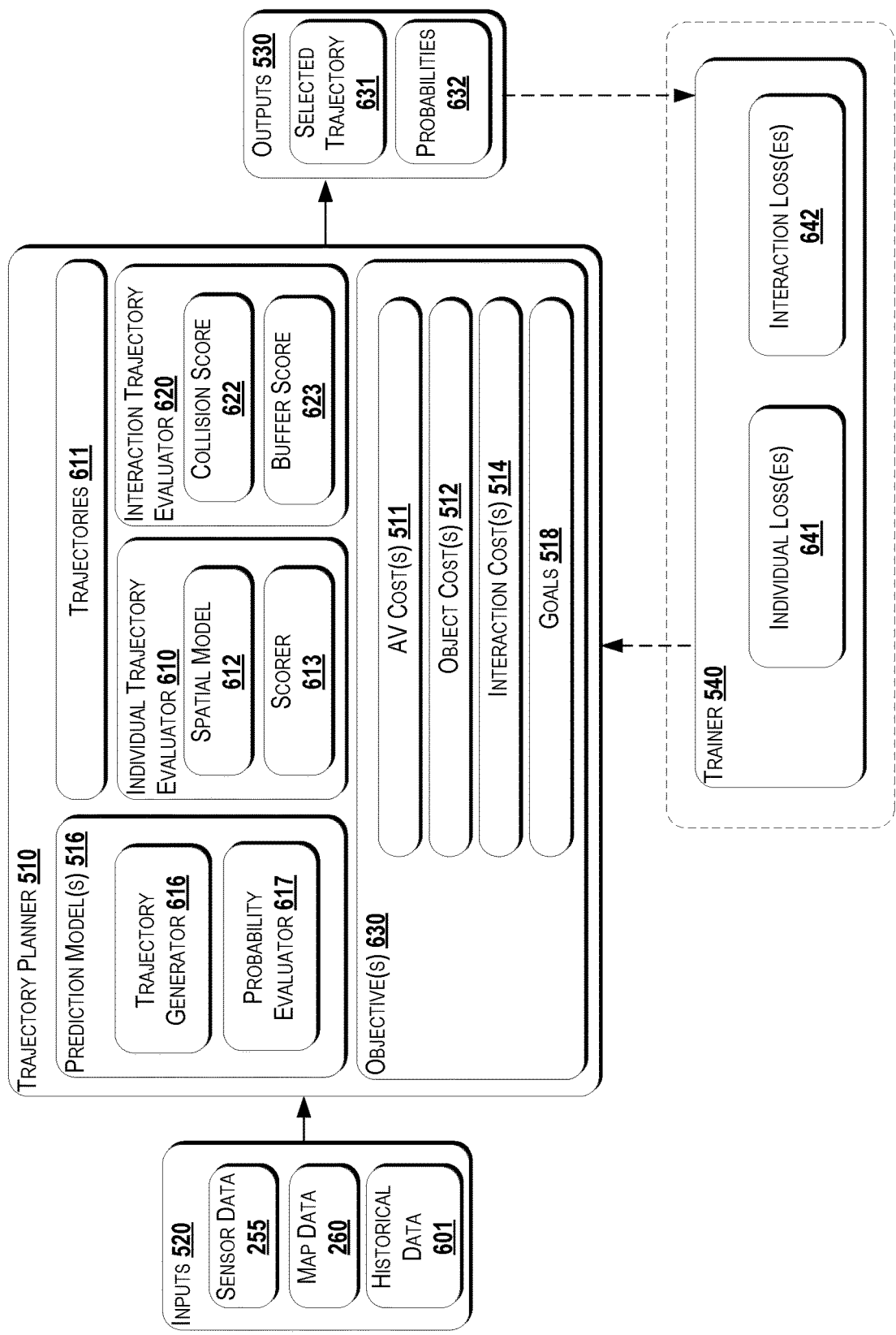
FIG. 6A is another example of a joint planning/prediction system according to some implementations of the present disclosure.

FIG. 6A depicts example system arrangements for some implementations of the trajectory planner 510. Inputs 520 can include, for example, sensor data (e.g., sensor data 255), map data (e.g., map data 260), and historical data 601 (e.g., data descriptive of one or more past states of any or all of a plurality of objects in an environment). In some implementations, historical data 601 can include a trajectory history of the objects, including their bounding box widths/heights and headings (e.g., optionally transformed into coordinates in the autonomous vehicle's reference frame). The input data can form contextual data for an autonomous vehicle in an environment. Using inputs 520, the trajectory planner 510 can implement an individual trajectory evaluator 610, an interaction trajectory evaluator 620, and one or more prediction models 516 to determine one or more objective(s) 630.

The individual trajectory evaluator 610 can obtain a plurality of potential trajectories 611 for the autonomous vehicle (e.g., a plurality of candidate vehicle motion trajectories for the autonomous vehicle) and/or for objects in an environment, etc. The plurality of trajectories 611 can be obtained, for example, from a trajectory generator 616 configured to generate one or more trajectories for the autonomous vehicle and/or each of a plurality of objects. The trajectory generator 616 can, for example, generate a continuous distribution of trajectories 611, and/or sample trajectories 611 to obtain a discrete selection of individually continuous trajectories 611 (e.g., trajectories structured according to a priori understandings of realistic trajectories for the autonomous vehicle and/or respective objects).

For example, in some implementations, the trajectory generator 616 can include a discrete trajectory sampler. In some implementations, the sampler estimates the initial speed and/or heading of an object given a provided past trajectory. From these values, the sampler can, in some implementations, sample from various trajectory modes corresponding to a priori understandings of how various objects are known or otherwise expected to travel through an environment. For instance, in some implementations, trajectory modes can include a straight line, a circular trajectory, or a spiral trajectory. In some implementations, each mode can correspond to a different probability. Within each mode, control parameters such as radius, acceleration can be uniformly sampled within a range to generate a sampled trajectory.

The trajectories 611 can be input into a spatial model 612 (e.g., with the input data as contextual data). In some implementations, the spatial model 612 is a machine-learned model (e.g., a neural network, such as a convolutional neural network). In some implementations, the input data can be downsampled (e.g., rasterized input data can be decreased in resolution). In some implementations, the spatial model 612 includes a plurality of sub-blocks each having a plurality of convolutional layers (e.g., optionally increasing in count with subsequent sub-blocks, and optionally followed by normalizing and/or nonlinear activation layer(s)) and each having a plurality of output channels (e.g., optionally increasing in count with subsequent sub-blocks). In some implementations, the sub-blocks can include one or more pooling layers dispersed therebetween (e.g., max-pooling layers, etc.). In some implementations, an output of each of one or more sub-blocks is input into a final sub-block for generation of a feature map.

An output of the spatial model 612 (e.g., an intermediate spatial encoding, such as a feature map) can be passed to a scorer 613 for producing a score. In some implementations, the score is an energy value (e.g., an individual energy component), and the scorer 613 generates the energy value for the plurality of trajectories 611. In some implementations, the scorer can generate a score for each of the trajectories 611 (e.g., an energy value associated with a respective object's traversal of each of the object trajectories for that respective object and an energy value associated with the autonomous vehicle's traversal of each of the vehicle motion trajectories for the autonomous vehicle). In some implementations, the scorer 613 includes one or more learnable parameters. In some implementations, the scorer 613 contains a machine-learned model, such as a neural network (e.g., a multi-layer perceptron).

In some implementations, the scorer 613 can obtain data from a feature map generated by the spatial model 612 using a region of interest. For example, a region of interest can be defined over a region of a map around the autonomous vehicle (e.g., centered around the autonomous vehicle, optionally rotated with the autonomous vehicle's heading). The region of interest can be processed by the scorer 613 (e.g., a neural network within the scorer 613, such as a multilayer perceptron containing a plurality of convolutional layers) to obtain a region of interest encoding for each object of a plurality of objects.

In some implementations, the scorer 613 can extract positional embeddings for each trajectory of a plurality of trajectories 611 (e.g., obtained as described above). In some implementations, the positional embeddings can be obtained at one or more timesteps by indexing the feature map (e.g., with interpolative methods, such as bilinear interpolation). In some implementations, the positional embeddings include a tensor containing a total horizon of the trajectory (e.g., for a plurality of past and future timesteps).

In some implementations, the scorer 613 can encode a plurality of trajectory embeddings for each timestep. In some implementations, the trajectory embeddings can include spatial location information (e.g., position information, such as relative position information from previous timestep(s)). In some implementations, the trajectory embeddings can include decomposed displacements, including distance magnitude(s) in the coordinate frame heading directions, etc.

The scorer 613 can input the various generated features and embeddings (e.g., any one or more of the region of interest encoding, the positional embeddings, or the trajectory embeddings) into a machine-learned model to output a score. The machine-learned model can include a neural network (e.g., a multilayer perceptron).

Figure 6B:
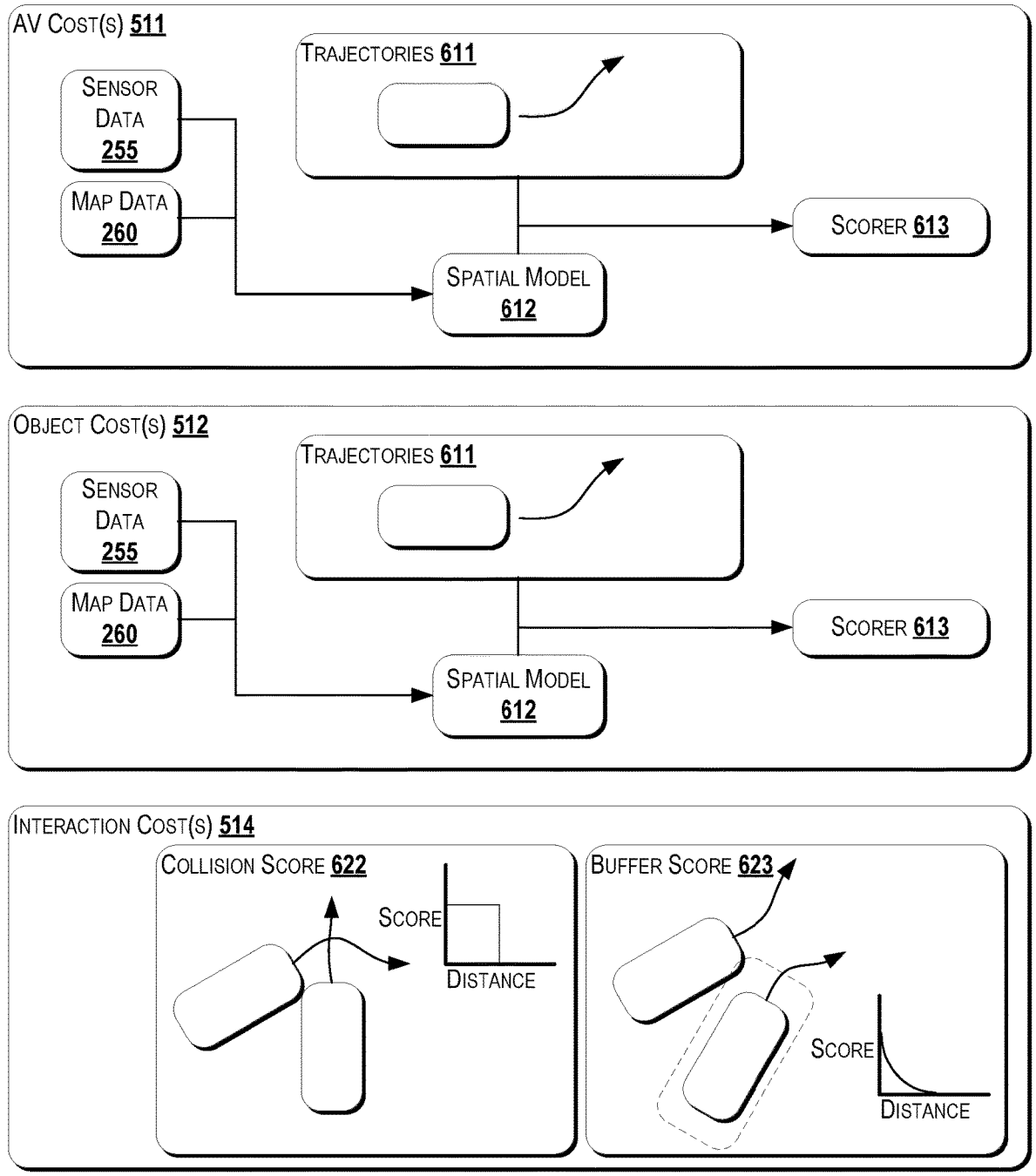
FIG. 6B illustrates costs used by an example joint planning/prediction system according to some implementations of the present disclosure.

FIG. 6B illustrates an example data flow for obtaining AV cost(s) 511 and object cost(s) 512. Contextual data (e.g., sensor data 255 and map data 260) can be input to the spatial model 612 with one or more trajectories from the trajectories 611. The spatial model 612 can output to the scorer 613. For instance, the spatial model 612 can output intermediate features generated from the contextual data and the trajectory or trajectories for scoring by the scorer 613.

With reference again to FIG. 6A, the interaction trajectory evaluator 620 can obtain a plurality of trajectories 611 (e.g., as described above) and determine one or more scores based on interactions between objects or interaction between the autonomous vehicle and the object(s) for the plurality of trajectories 611. For instance, a collision score 622 and a buffer score 623 can be determined between two objects for a set of two trajectories respectively associated with the objects and/or determined between the autonomous vehicle and an object for a vehicle motion trajectory and an object trajectory respectively associated with the autonomous vehicle and the object. In some implementations, the collision score 622 and the buffer score 623 can include a collision energy and a buffer energy, respectively.

FIG. 6B illustrates example implementations of the collision score 622 and the buffer score 623. As illustrated in FIG. 6B, for instance, a collision score can include a value based on whether two paired object trajectories might cause the respective objects traversing the trajectories to come into contact (e.g., optionally determined at a threshold distance). A collision score can include a value based on whether a vehicle motion trajectory paired with an object trajectory might cause the autonomous vehicle and the respective object traversing the trajectories to come into contact (e.g., optionally determined at a threshold distance). In FIG. 6B, for example, the collision score is plotted as a discrete function (e.g., a first value if in contact, another value if not, etc.). As illustrated in FIG. 6B, for instance, a buffer score can include a value based on whether objects respectively traversing two paired object trajectories pass within a given buffer distance (e.g., within a given proximity threshold, 3 ft., 5 ft., 7 ft., etc.). In FIG. 6B, for example, the buffer score 623 is plotted as a continuous, smooth function as a function of a distance. The buffer distance can be evaluated, in some implementations, based on a distance from a bounding box (e.g., bounding box 699).

With reference again to FIG. 6A, the objective(s) 630 can include the AV cost(s) 511, object cost(s) 512, interaction cost(s) 514, and goal(s) 518 (if any). The objective(s) 630 can be based at least in part on the score(s) from the individual trajectory evaluator 610 and the interaction trajectory evaluator 620. The objective(s) 630 can also be based at least in part on the probability evaluator 617.

The probability evaluator 617 can provide one or more probabilities for each of the trajectories 611. For example, the probability evaluator 617 can provide one or more conditional probabilities for a plurality of object trajectories of the trajectories 611 for the objects conditioned on each of a set of potential vehicle motion trajectories for the autonomous vehicle. For example, the probability evaluator 617 can provide for the expectation of a system energy conditioned on each of a set of potential vehicle motion trajectories for the autonomous vehicle in some implementations. In some implementations, the probability evaluator 617 can provide the marginal and pairwise marginal probabilities between all object trajectories over the set of be vehicle motion trajectories.

In some implementations, the objective(s) 630 can be determined by combining the probabilities output by the probability evaluator 617 and the scores output by the individual trajectory evaluator 610 and the interaction trajectory evaluator 620. For instance, the object cost(s) 512 can include a combination of (e.g., the product of) a marginal probability of an object trajectory given a potential vehicle motion trajectory of the autonomous vehicle. The interaction cost(s) 514 can include a combination of (e.g., the product of) a marginal probability of the pairing of two object trajectories given the potential vehicle motion trajectory of the autonomous vehicle. The interaction cost(s) 514 can include a combination of (e.g., the product of) a marginal probability of the pairing of a vehicle motion trajectory and an object trajectory given the potential vehicle motion trajectory of the autonomous vehicle. In this manner, for instance, example implementations according to aspects of the present disclosure can provide for interactive joint planning/prediction by determining a planning objective for an autonomous vehicle trajectory based on objects' interactions with a planned vehicle motion trajectory for the autonomous vehicle.

For example, in some implementations, the objective(s) 630 can include an objective that can be expressed as in Equation 4. In some implementations, for a given potential vehicle motion trajectory for the autonomous vehicle, the expectation of Equation 4 can be expressed as $$f = C_{traj}^{y_0} + \sum_{y_r} p_{y_r|y_0} \left[ \sum_{i=1}^{N} C_{inter}^{y_0,y_i} + \sum_{i=1}^{N} C_{traj}^{y_i} + \sum_{i=1,j=1}^{N,N} C_{inter}^{y_i,y_j} \right] \quad (6)$$

where p $\mathcal{Y}_{r|y_0}$ is shorthand for p( $\mathcal{Y}_r|y_0$, χ; w), and $C_{traj}^{y_i}$ is shorthand for $C_{traj}$ ($y_i$, χ; w) (same for pairwise). In some implementations, the joint probabilities factorize over the individual energy components and the interaction energy components, so the objective can be expressed in terms of the marginal and pairwise marginal probabilities between all objects' trajectories as $$f = C_{traj}^{y_0} + \sum_{i,y_i} p_{y_i|y_0} C_{inter}^{y_0,y_i} + \sum_{i,y_i} p_{y_i|y_0} C_{traj}^{y_i} + \sum_{i,j,y_i,y_j}^{N,N} p_{y_i|y_0} C_{inter}^{y_i,y_j} \quad (7)$$

where $p_{y_i|y_0}$ represents the marginal probability of the object trajectory $y_i$ conditioned on the potential vehicle motion trajectory $y_0$ for the autonomous vehicle. In some implementations, the $C_{inter}^{y_i,y_j}$ terms can be omitted. In some implementations, the $C_{inter}^{y_i,y_j}$ terms can be included only for objects nearby the autonomous vehicle (e.g., within a given distance, such as a given radius defined in space or time). In some implementations, the marginal probabilities can be generated as tensors having dimensions according to the number of objects, the number of trajectories for each object and the number of potential vehicle motion trajectories (e.g., candidate trajectories). For example, with N−1 objects having K trajectories each, and including K potential trajectories for the autonomous vehicle, the marginal probabilities can, in some implementations, be expressed in a tensor having dimensions N by K by K.

In some implementations, the probability evaluator 617 can include a machine-learned model (e.g., a neural network, such as a recurrent neural network). In some implementations, the probability evaluator 617 can implement a message-passing algorithm such as loopy belief propagation. Loopy belief propagation is an example of a differentiable iterative message passing procedure. For instance, the marginal probabilities can all be efficiently approximated by exploiting a message-passing algorithm such as loopy belief propagation. In some implementations, the probability evaluator 617 can provide for efficient batch evaluation. For instance, for every trajectory of every object, the system can evaluate the conditional marginal probability times the corresponding energy term.

The output(s) 530 can include a selected trajectory 631 (e.g., a target trajectory, such as a target vehicle motion trajectory). The selected trajectory 631 can be determined using the objective(s) 630. For instance, the selected trajectory 631 can correspond to a preferred value of the objective(s) 630 (e.g., a low value, such as the lowest value, which can include a local and/or global minimum).

In some embodiments, the trainer 540 can use the selected trajectory 631 to computed a training loss. In some embodiments, however, the trainer 540 can use the probabilities 632 (e.g., determined by the probability evaluator 617) to generate one or more training losses. For example, a cross-entropy loss used by the trainer 540 can be expressed as $$\mathcal{L} = \sum_i \mathcal{L}_i + \sum_{i,j} \mathcal{L}_{i,j} \quad (8)$$

where the individual loss 641 for the i-th object can be expressed in some implementations as $$\mathcal{L}_i = \frac{1}{K} \sum_{y_i \notin \Delta(y_i^*)} p_{g.t.}(y_i) \log p(y_i, X; w) \qquad (9)$$

and where the interaction loss 642 between the i-th and the j-th object can be expressed in some implementations as $$\mathcal{L}_{y_i, y_j} = \frac{1}{K^2} \sum_{\substack{y_i \notin \Delta(y_i^*), \\ y_j \notin \Delta(y_j^*)}} p_{g.t.}(y_i, y_j) \log p(y_i, y_j, X; w) \qquad (10)$$

where $\Delta(y^*_i)$ is used to indicate a set of predicted/obtained trajectories 611 that are within a tolerance distance of the reference (e.g., a reference $y^*_i$ for the i-th object). In some implementations, $p_{g.t.}$ can be used as an indicator that is one value (e.g., zero) unless the input (e.g., $y_i$, or $y_i$, $y_j$) is equal to the reference (e.g., ground truth).

In some implementations, the strength of interactivity of the trajectory planning can be modulated. For instance, with reference again to FIGS. 4A and 4B, it might be desired to modulate the assertiveness with which autonomous vehicle 300 injects itself into the target lane 302 to induce an interaction from the object 312. In some implementations, the level of interactivity can be modulated by varying the size of the conditioning set in the prediction model of the interactive objective.

For example, the interactivity can be modulated by constructing the conditional probability for each object trajectory $y_i$ to be conditioned on a variable set of vehicle potential trajectories $S^{y_o}$ with k, $1 \leq k \leq K$ elements, which are the top-k potential vehicle motion trajectories closest to a given potential trajectory $y_0$ (e.g., by a distance, such as by an L2 distance). For example, in some implementations, the probability can be expressible as $$p(y_i \mid S^{y_0}, X; w) = \frac{1}{Z} \sum_{\overline{y}_0 \in S^{y_0}} p(y_i, \overline{y}_0, X; w) \qquad (11)$$

where Z is a normalizing constant, and the interactivity of the planning objective can be seen as decreasing as $S^{y_o}$ increases in members. For example, when $S^{y_o}$ contains K members, it can intuitively be understood as adding up the conditional probabilities on all possible vehicle motion trajectories, which can effectively remove the conditionality of the overall probability on any one vehicle motion trajectory. As $S^{y_o}$ contains some number of members less than K, it can provide for a modulated level of interactivity. In some implementations, decreasing the size of $S^{y_o}$ can provide for increasing success rates for maneuvers (e.g., by providing for more interactive planning, enabling "nudging" behavior). In this manner, for example, maneuver success rates can be balanced with other constraints (e.g., contact constraints, buffer constraints, etc.) by manipulating the size of $S^{y_o}$.

Figure 7:
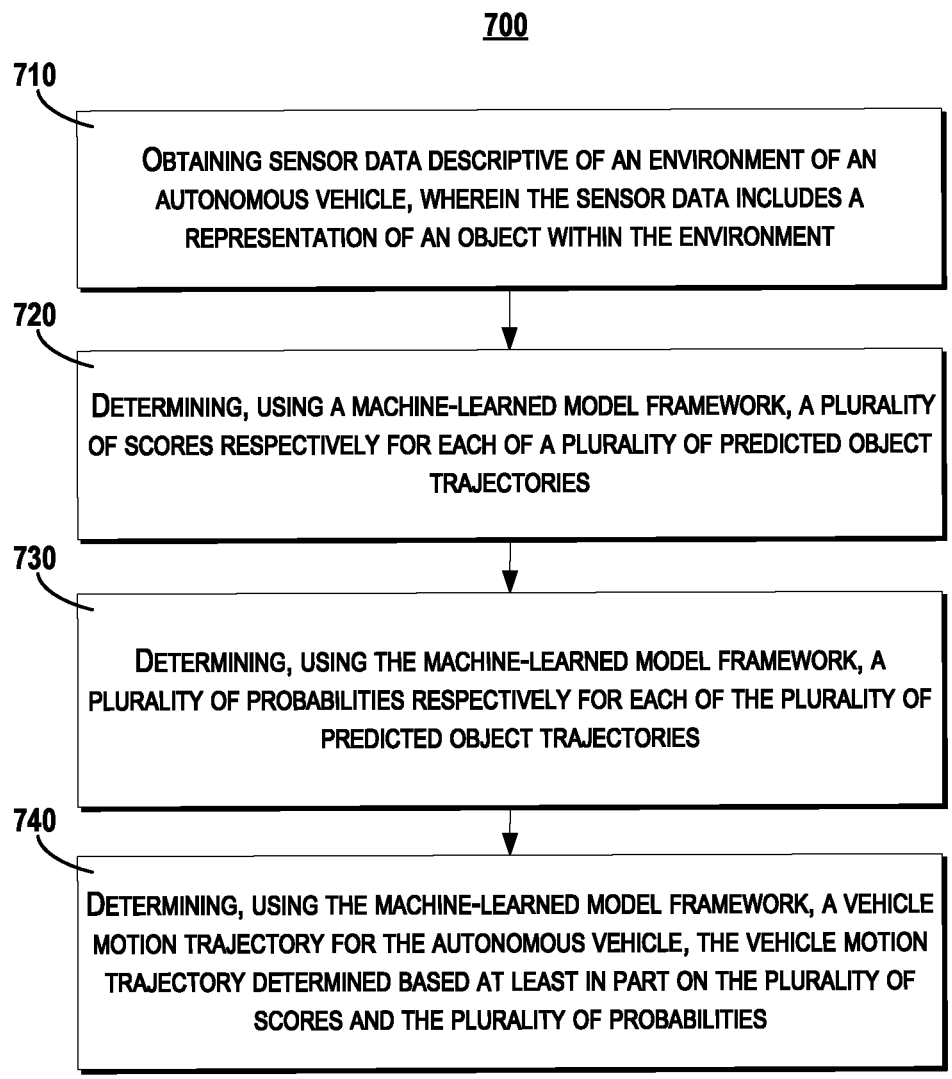
FIG. 7 is a flowchart of an example method for joint planning/prediction according to some aspects of the present disclosure.

FIG. 7 depicts a flowchart of a method 700 for joint interactive prediction/planning (e.g., as discussed above with respect to FIGS. 5 and 6) according to aspects of the present disclosure. One or more portion(s) of the method 700 can be implemented by a computing system that includes one or more computing devices such as, for example, the computing systems described with reference to the other figures (e.g., autonomous platform 105, vehicle computing system 210, operations computing system(s) 290A, remote computing system(s) 290B, system 500, a system of FIG. 11, etc.). Each respective portion of the method 700 can be performed by any (or any combination) of one or more computing devices. Moreover, one or more portion(s) of the method 700 can be implemented on the hardware components of the device(s) described herein (e.g., as in FIGS. 1, 2, 5, 6A, 6B, 11, etc.), for example, to perform joint interactive prediction/planning. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 7 is described with reference to elements/terms described with respect to other systems and figures for exemplary illustrated purposes and is not meant to be limiting. One or more portions of method 700 can be performed additionally, or alternatively, by other systems.

At 710, example method 700 includes obtaining contextual data (e.g., sensor data) associated with an environment of an autonomous vehicle (e.g., descriptive of the environment). In some implementations, the contextual data can include sensor data including a representation of an object within the environment. The object(s) can include any number of moveable or moving objects such as, for example, one or more pedestrians, animals, vehicles, etc.

At 720, example method 700 includes determining, using a machine-learned model framework, a plurality of scores respectively for each of a plurality of predicted object trajectories (for example, as discussed above with respect to FIGS. 5 and 6). In some implementations, for instance, the score for one or more of the predicted object trajectories can include an energy value.

At 730, example method 700 includes determining, using the machine-learned model framework, a plurality of probabilities respectively for each of the plurality of predicted object trajectories (for example, as discussed above with respect to FIGS. 5 and 6). In some implementations, for instance, the plurality of probabilities can be determined conditioned on the vehicle motion trajectory. For example, each respective probability of the plurality of probabilities can encode a likelihood (e.g., an estimated likelihood) that a respective object might traverse a respective predicted object trajectory.

At 740, example method 700 includes determining, using the machine-learned model framework, a vehicle motion trajectory for the autonomous vehicle. In some implementations of example method 700, the vehicle motion trajectory can be determined based at least in part on the plurality of scores and the plurality of probabilities. For example, in some implementations, the plurality of scores (e.g., energies) and the plurality of probabilities can be combined (e.g., linearly combined). For instance, in some implementations, a total system score or energy can include a plurality of energies linearly combined according to their respective probabilities. In this manner, for example, a minimization can be performed (e.g., by comparing candidate vehicle motion trajectories) to obtain a desired system score or energy (e.g., optimized, such as a minimized system energy), such that a vehicle motion trajectory can be determined (e.g., a target vehicle motion trajectory) jointly with the plurality of predicted object trajectories and accounting for the interaction of the predicted object trajectories with the vehicle motion trajectories.

For example, in some implementations, the example method 700 can further include determining, using the machine-learned model framework, a plurality of candidate vehicle motion trajectories for the autonomous vehicle (e.g., a plurality of potential vehicle motion trajectories), and selecting a target vehicle motion trajectory from among the plurality of candidate vehicle motion trajectories based on a minimization of the plurality of costs. In some implementations, each respective predicted object trajectory of the plurality of predicted object trajectories is associated with a probability of the respective predicted object trajectory conditioned on each of the plurality of candidate vehicle motion trajectories.

In some implementations, the machine-learned model framework can include structured components. For instance, the plurality of predicted object trajectories can include trajectories sampled from a distribution (e.g., a discrete distribution) of potentially realistic trajectories for an object. For example, the sampled trajectories can, in some implementations, provide for an interpretable prediction component within the machine-learned model framework.

Figure 8:
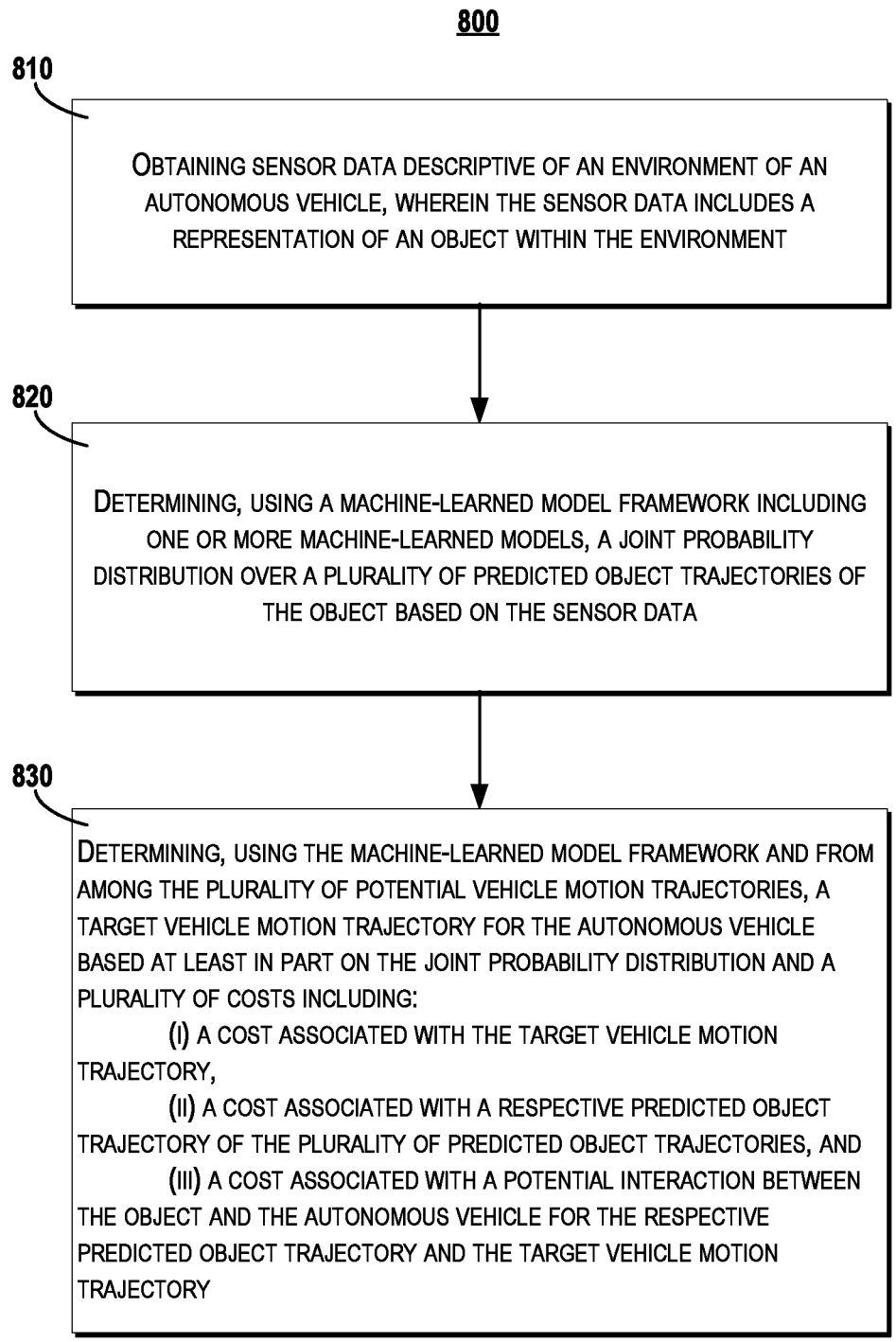
FIG. 8 is a flowchart of an example method for joint planning/prediction according to some aspects of the present disclosure.

FIG. 8 depicts a flowchart of a method 800 for joint interactive prediction/planning (e.g., as discussed above with respect to FIGS. 5 and 6) according to aspects of the present disclosure. One or more portion(s) of the method 800 can be implemented by a computing system that includes one or more computing devices such as, for example, the computing systems described with reference to the other figures (e.g., autonomous platform 105, vehicle computing system 210, operations computing system(s) 290A, remote computing system(s) 290B, system 500, a system of FIG. 11, etc.). Each respective portion of the method 800 can be performed by any (or any combination) of one or more computing devices. Moreover, one or more portion(s) of the method 800 can be implemented on the hardware components of the device(s) described herein (e.g., as in FIGS. 1, 2, 5, 6A, 6B, 11, etc.), for example, to perform joint interactive prediction/planning. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 8 is described with reference to elements/terms described with respect to other systems and figures for exemplary illustrated purposes and is not meant to be limiting. One or more portions of method 800 can be performed additionally, or alternatively, by other systems.

At 810, example method 800 includes obtaining sensor data descriptive of an environment of an autonomous vehicle. In some implementations of example method 800, the sensor data includes a representation of an object within the environment. The object(s) can include any number of moveable or moving objects such as, for example, one or more pedestrians, animals, vehicles, etc.

At 820, example method 800 includes determining, using a machine-learned model framework comprising one or more machine-learned models, a joint probability distribution over a plurality of predicted object trajectories of the object based on the sensor data. In some implementations of example method 800, the plurality of predicted object trajectories are conditioned on a plurality of potential vehicle motion trajectories of the autonomous vehicle. In some implementations, the plurality of predicted object trajectories and/or the plurality of potential vehicle motion trajectories can be sampled from a distribution of potential trajectories (e.g., potentially realistic trajectories).

At 830, example method 800 includes determining, using the machine-learned model framework and from among the plurality of potential vehicle motion trajectories, a target vehicle motion trajectory for the autonomous vehicle based at least in part on the joint probability distribution and a plurality of costs. In some implementations of example method 800, the plurality of costs include a cost associated with the target vehicle motion trajectory (e.g., a cost for the autonomous vehicle), a cost associated with a respective predicted object trajectory of the plurality of predicted object trajectories (e.g., a cost for the respective object corresponding thereto of the object(s) in the environment), and a cost associated with a potential interaction between the object and the autonomous vehicle for the respective predicted object trajectory and the target vehicle motion trajectory. Costs (i) and (ii) can, in some implementations, correspond to individual costs (e.g., AV cost(s) 511, object cost(s) 512) that can encode a score or other value for traversing a trajectory for a respective object or the autonomous vehicle. In some implementations, cost (ii) includes an expectation, such as an expectation over a probability distribution conditioned on the vehicle motion trajectory. In some implementations, cost (iii) includes interaction costs (e.g., interaction cost(s) 514) that can encode a score or other value for the two or more objects for the respective predicted object trajectories having the potential interaction, or a score or other value for a pairing of the autonomous vehicle and an object, for the vehicle motion trajectory and the respective predicted object trajectory for the object.

FIG. 9 depicts a flowchart of a method 900 for joint interactive prediction/planning (e.g., as discussed above with respect to FIGS. 5 and 6) according to aspects of the present disclosure. One or more portion(s) of the method 900 can be implemented by a computing system that includes one or more computing devices such as, for example, the computing systems described with reference to the other figures (e.g., autonomous platform 105, vehicle computing system 210, operations computing system(s) 290A, remote computing system(s) 290B, system 500, a system of FIG. 11, etc.). Each respective portion of the method 900 can be performed by any (or any combination) of one or more computing devices. Moreover, one or more portion(s) of the method 900 can be implemented on the hardware components of the device(s) described herein (e.g., as in FIGS. 1, 2, 5, 6A, 6B, 11, etc.), for example, to perform joint interactive prediction/planning. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 9 is described with reference to elements/terms described with respect to other systems and figures for exemplary illustrated purposes and is not meant to be limiting. One or more portions of method 900 can be performed additionally, or alternatively, by other systems.

As depicted in FIG. 9, example method 900 includes at least one implementation of portion 810 from example method 800. It is to be understood that any one or more portions of example method 800 (e.g., 820, 830) can also be combined or otherwise incorporated into example method 900.

At 920, example method 900 includes determining, using a machine-learned model framework comprising one or more machine-learned models, a plurality of predicted object trajectories of the object based on the sensor data. In some implementations, the plurality of predicted object trajectories can be sampled from a distribution of potential trajectories (e.g., potentially realistic trajectories).

At 930, example method 900 includes determining, using the machine-learned model framework, a target vehicle motion trajectory for the autonomous vehicle based on the plurality of predicted object trajectories and a predicted object interaction with the target vehicle motion trajectory. For example, in some implementations of example method 900, the machine-learned model framework can be configured to determine the target vehicle motion trajectory based at least in part on a plurality of costs. In some implementations of example method 900, the plurality of costs include a cost associated with the target vehicle motion trajectory (e.g., a cost for the autonomous vehicle), a cost associated with a respective predicted object trajectory of the plurality of predicted object trajectories (e.g., a cost for the respective object corresponding thereto), and a cost associated with a potential interaction between the object and the autonomous vehicle for the respective predicted object trajectory and the target vehicle motion trajectory. Costs (i) and (ii) can, in some implementations, correspond to individual costs (e.g., AV cost(s) 511, object cost(s) 512) that can encode a score or other value for traversing a trajectory for a respective object or the autonomous vehicle. In some implementations, cost (ii) includes an expectation, such as an expectation over a probability distribution conditioned on the vehicle motion trajectory. In some implementations, cost (iii) includes interaction costs (e.g., interaction cost(s) 514) that can encode a score or other value for the two or more objects for the respective predicted object trajectories having the potential interaction, or a score or other value for a pairing of the autonomous vehicle and an object, for the vehicle motion trajectory and the respective predicted object trajectory for the object.

At 940, portion 930 of method 900 includes determining, using the machine-learned model framework, a joint probability distribution over the plurality of predicted object trajectories. In some implementations of the example method 900, the joint probability distribution is indicative of probabilities for the plurality of predicted object trajectories. In some implementations, each respective predicted object trajectory of the plurality of predicted object trajectories is associated with a probability of the respective predicted object trajectory conditioned on the target vehicle motion trajectory.

For example, in some implementations, the example method 900 can further include determining, using the machine-learned model framework, a plurality of candidate vehicle motion trajectories for the autonomous vehicle (e.g., a plurality of potential vehicle motion trajectories), and selecting the target vehicle motion trajectory from among the plurality of candidate vehicle motion trajectories based on a minimization of the plurality of costs. In some implementations, each respective predicted object trajectory of the plurality of predicted object trajectories is associated with a probability of the respective predicted object trajectory conditioned on each of the plurality of candidate vehicle motion trajectories.

Figure 10:
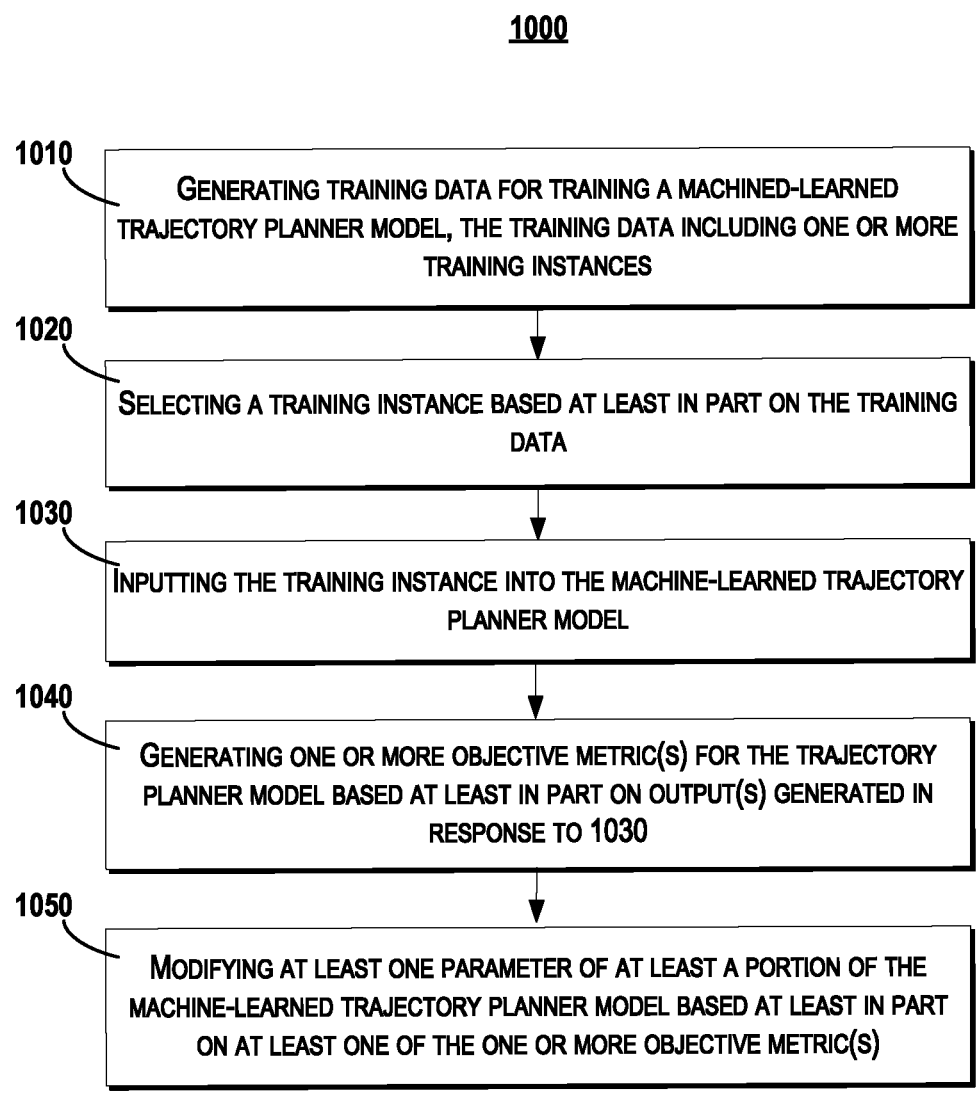
FIG. 10 is a flowchart of a method for training a machine-learned model for joint planning/prediction according to some aspects of the present disclosure.

FIG. 10 depicts a flowchart of a method 1000 for training one or more example machine-learned models (e.g., as discussed above with respect to FIGS. 5 and 6) according to aspects of the present disclosure. One or more portion(s) of the method 1000 can be implemented by a computing system that includes one or more computing devices such as, for example, the computing systems described with reference to the other figures (e.g., autonomous platform 105, vehicle computing system 210, operations computing system(s) 290A, remote computing system(s) 290B, system 500, a system of FIG. 11, etc.). Each respective portion of the method 1000 can be performed by any (or any combination) of one or more computing devices. Moreover, one or more portion(s) of the method 1000 can be implemented on the hardware components of the device(s) described herein (e.g., as in FIGS. 1, 2, 5, 6A, 6B, 11, etc.), for example, to train machine-learned models. FIG. 10 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 10 is described with reference to elements/terms described with respect to other systems and figures for exemplary illustrated purposes and is not meant to be limiting. One or more portions of method 1000 can be performed additionally, or alternatively, by other systems.

At 1010, the method 1000 can include generating training data for training a machine-learned trajectory planner model (e.g., a model containing or otherwise implementing one or more portions of example system 500, such as a trajectory planner 510). For example, a computing system (e.g., autonomous platform 105, vehicle computing system 210, operations computing system(s) 290A, remote computing system(s) 290B, system 500, system of FIG. 10, etc.) can generate the training data for training the machine-learned trajectory planner model. The training data can include a plurality of training instances, such as pre-recorded inputs (e.g., perception data, map data, etc.) corresponding to ground truth trajectories (e.g., recorded trajectories for one or more moving objects and/or the autonomous vehicle).

The training data can be collected using one or more autonomous platforms (e.g., autonomous platform 105) or the sensors thereof as the autonomous platform is within its environment. By way of example, the training data can be collected using one or more autonomous vehicle(s) (e.g., autonomous platform 105, autonomous vehicle 205, etc.) or sensors thereof as the vehicle(s) operates along one or more travel ways. The training data can include a plurality of training sequences divided between multiple datasets (e.g., a training dataset, a validation dataset, or testing dataset). Each training sequence can include a plurality of map data, context information, pre-recorded perception data, etc.

In some implementations, each sequence can include LiDAR point clouds (e.g., collected using LiDAR sensors of an autonomous platform) or high definition map information (e.g., structured lane topology data). For instance, in some implementations, a plurality of images can be scaled for training and evaluation.

At 1020, the method 1000 can include selecting a training instance based at least in part on the training data. For example, a computing system can select the training instance based at least in part on the training data.

At 1030, the method 1000 can include inputting the training instance into the machine-learned trajectory planner model. For example, a computing system can input the training instance into the machine-learned trajectory planner model.

At 1040, the method 1000 can include generating loss metric(s) for the machine-learned trajectory planner model based on output(s) of at least a portion of the machine-learned trajectory planner model in response to inputting the training instance (e.g., at 1030). For example, a computing system can generate the loss metric(s) for the machine-learned trajectory planner model based on the output(s) of at least the portion of the machine-learned trajectory planner model in response to the training instance. The loss metric(s), for example, can include a loss as described herein based at least in part on a probability determined for one or more object trajectories.

For instance, in some implementations, the loss metric(s) can include a cross-entropy loss. In some implementations, the loss can be counted only for those trajectories that diverge from the ground truth trajectories. In some implementations, the loss can be counted only for those trajectories that diverge from reference trajectories by a specified amount (e.g., a tolerance). For instance, the loss can be determined over a subset of the plurality of trajectories for a respective object, where the subset is configured to exclude one or more of the predicted trajectories for that respective object that are within a tolerance distance of a corresponding reference trajectory for that respective object. For instance, the loss can be determined over a subset of the plurality of vehicle motion trajectories for the autonomous vehicle, where the subset is configured to exclude one or more of the predicted vehicle motion trajectories that are within a tolerance distance of a corresponding reference vehicle motion trajectory. In some implementations, for instance, trajectories within the tolerance distance can be considered a reference equivalent (e.g., close enough, such as still within the same lane or other course of travel as the reference, such as within an inconsequential variation from a reference path along a travel way, etc.).

At 1050, the method 1000 can include modifying at least the portion of the machine-learned trajectory planner model based at least in part on at least one of the loss metric(s). For example, a computing system can modify at least the portion of the machine-learned trajectory planner model based, at least in part, on at least one of the loss metric(s).

In some implementations, the machine-learned model framework can be trained in an end-to-end manner. For example, in some implementations, the machine-learned model framework can be fully differentiable.

Figure 11:
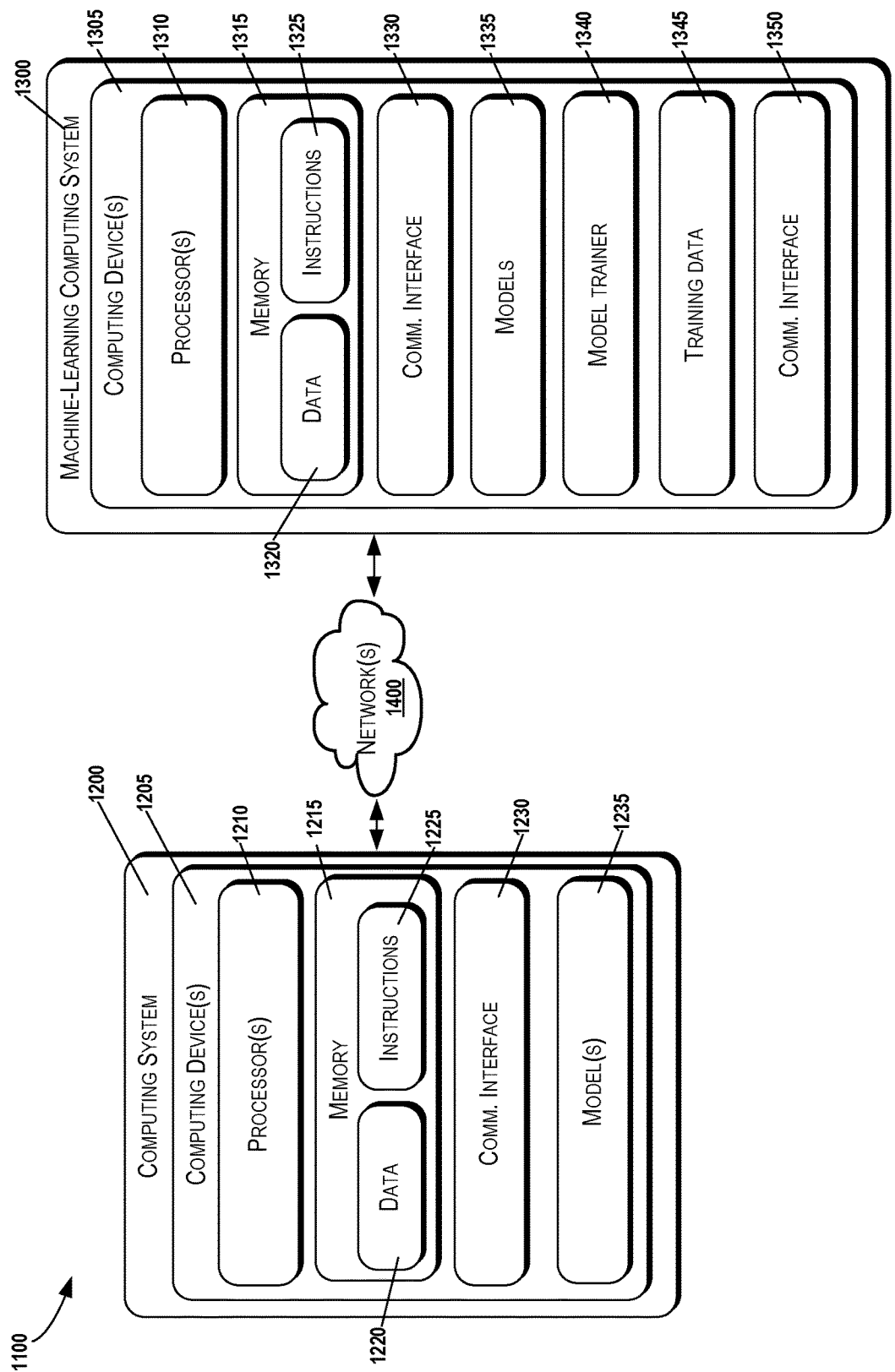
FIG. 11 is a block diagram of a computing system for joint planning/prediction according to some embodiments of the present disclosure.

FIG. 11 is a block diagram of an example computing system 1100, according to some embodiments of the present disclosure. The example system 1100 includes a computing system 1200 and a machine-learning computing system 1300 that are communicatively coupled over one or more networks 1400.

In some implementations, the computing system 1200 can perform one or more observation tasks such as, for example, by obtaining sensor data (e.g., two-dimensional, three-dimensional, etc.). In some implementations, the computing system 1200 can be included in an autonomous platform. For example, the computing system 1200 can be on-board an autonomous vehicle. In other implementations, the computing system 1200 is not located on-board an autonomous platform. The computing system 1200 can include one or more distinct physical computing devices 1205.

The computing system 1200 (or one or more computing device(s) 1205 thereof) can include one or more processors 1210 and a memory 1215. The one or more processors 1210 can be any suitable processing device (e.g., a processor core, a microprocessor, an ASIC, a FPGA, a controller, a microcontroller, etc.) and can be one processor or a plurality of processors that are operatively connected. The memory 1215 can include one or more non-transitory computer-readable storage media, such as RAM, ROM, EEPROM, EPROM, one or more memory devices, flash memory devices, etc., and combinations thereof.

The memory 1215 can store information that can be accessed by the one or more processors 1210. For instance, the memory 1215 (e.g., one or more non-transitory computer-readable storage mediums, memory devices) can store data 1220 that can be obtained, received, accessed, written, manipulated, created, or stored. The data 1220 can include, for instance, sensor data, two-dimensional data, three-dimensional, image data, LiDAR data, model parameters, simulation data, trajectory data, contextual data, potential trajectories, sampled trajectories, probability data, or any other data or information described herein. In some implementations, the computing system 1200 can obtain data from one or more memory device(s) that are remote from the computing system 1200.

The memory 1215 can also store computer-readable instructions 1225 that can be executed by the one or more processors 1210. The instructions 1225 can be software written in any suitable programming language or can be implemented in hardware. Additionally, or alternatively, the instructions 1225 can be executed in logically or virtually separate threads on processor(s) 1210.

For example, the memory 1215 can store instructions 1225 that when executed by the one or more processors 1210 cause the one or more processors 1210 (the computing system 1200) to perform any of the operations, functions, or methods/processes described herein, including, for example, planning trajectories, such as by implementing a trajectory planner 510, etc.

According to an aspect of the present disclosure, the computing system 1200 can store or include one or more machine-learned models 1235. As examples, the machine-learned models 1235 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the computing system 1200 can include one or more models of a trajectory planner 510, such as are discussed above with respect to FIGS. 5 and 6.

In some implementations, the computing system 1200 can receive the one or more machine-learned models 1235 from the machine-learning computing system 1300 over network(s) 1400 and can store the one or more machine-learned models 1235 in the memory 1215. The computing system 1200 can then use or otherwise implement the one or more machine-learned models 1235 (e.g., by processor(s) 1210). In particular, the computing system 1200 can implement the machine-learned model(s) 1235 to plan trajectories, etc.

The machine learning computing system 1300 can include one or more computing devices 1305. The machine learning computing system 1300 can include one or more processors 1310 and a memory 1315. The one or more processors 1310 can be any suitable processing device (e.g., a processor core, a microprocessor, an ASIC, a FPGA, a controller, a microcontroller, etc.) and can be one processor or a plurality of processors that are operatively connected. The memory 1315 can include one or more non-transitory computer-readable storage media, such as RAM, ROM, EEPROM, EPROM, one or more memory devices, flash memory devices, etc., and combinations thereof.

The memory 1315 can store information that can be accessed by the one or more processors 1310. For instance, the memory 1315 (e.g., one or more non-transitory computer-readable storage mediums, memory devices) can store data 1320 that can be obtained, received, accessed, written, manipulated, created, or stored. The data 1320 can include, for instance, sensor data, two-dimensional data, three-dimensional, image data, LiDAR data, model parameters, simulation data, data associated with models, trajectory data, data associated with graphs and graph nodes, acceleration profiles, algorithms, cost data, goal data, probability data, or any other data or information described herein. In some implementations, the machine learning computing system 1300 can obtain data from one or more memory device(s) that are remote from the machine learning computing system 1300.

The memory 1315 can also store computer-readable instructions 1325 that can be executed by the one or more processors 1310. The instructions 1325 can be software written in any suitable programming language or can be implemented in hardware. Additionally, or alternatively, the instructions 1325 can be executed in logically or virtually separate threads on processor(s) 1310.

For example, the memory 1315 can store instructions 1325 that when executed by the one or more processors 1310 cause the one or more processors 1310 (the computing system) to perform any of the operations or functions described herein, including, for example, training a machine-learned trajectory planner model, planning vehicle motion trajectories, etc.

In some implementations, the machine learning computing system 1300 includes one or more server computing devices. If the machine learning computing system 1300 includes multiple server computing devices, such server computing devices can operate according to various computing architectures, including, for example, sequential computing architectures, parallel computing architectures, or some combination thereof.

In addition, or alternatively to the model(s) 1235 at the computing system 1200, the machine learning computing system 1300 can include one or more machine-learned models 1335. As examples, the machine-learned models 1335 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the computing system 1200 can include one or more models of a trajectory planner 510, such as are discussed above with respect to FIGS. 5 and 6.

In some implementations, the machine learning computing system 1300 or the computing system 1200 can train the machine-learned models 1235 or 1335 through use of a model trainer 1340. The model trainer 1340 can train the machine-learned models 1235 or 1335 using one or more training or learning algorithms. One example training technique is backwards propagation of errors. In some implementations, the model trainer 1340 can perform supervised training techniques using a set of labeled training data. In other implementations, the model trainer 1340 can perform unsupervised training techniques using a set of unlabeled training data. By way of example, the model trainer 1340 can train the machine-learned trajectory generation model through unsupervised energy minimization training techniques using an objective function (e.g., as described herein). The model trainer 1340 can perform a number of generalization techniques to improve the generalization capability of the models being trained. Generalization techniques include weight decays, dropouts, or other techniques.

The computing system 1200 and the machine learning computing system 1300 can each include a communication interface 1230 and 1350, respectively. The communication interfaces 1230/1350 can be used to communicate with one or more systems or devices, including systems or devices that are remotely located from the computing system 1200 and the machine learning computing system 1300. A communication interface 1230/1350 can include any circuits, components, software, etc. for communicating with one or more networks (e.g., 1400). In some implementations, a communication interface 1230/1350 can include, for example, one or more of a communications controller, receiver, transceiver, transmitter, port, conductors, software or hardware for communicating data.

The network(s) 1400 can be any type of network or combination of networks that allows for communication between devices. In some embodiments, the network(s) can include one or more of a local area network, wide area network, the Internet, secure network, cellular network, mesh network, peer-to-peer communication link or some combination thereof and can include any number of wired or wireless links. Communication over the network(s) 1400 can be accomplished, for instance, through a network interface using any type of protocol, protection scheme, encoding, format, packaging, etc.

FIG. 11 illustrates one example system 1100 that can be used to implement the present disclosure. Other systems can be used as well. For example, in some implementations, the computing system 1200 can include the model trainer 1340 and the training data 1345. In such implementations, the machine-learned models 1335 can be both trained and used locally at the computing system 1200. As another example, in some implementations, the computing system 1200 is not connected to other computing systems.

In addition, components illustrated or discussed as being included in one of the computing systems 1200 or 1300 can instead be included in another of the computing systems 1200 or 1300. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein. Also, terms such as "based on" should be understood as "based at least in part on".

What is claimed is:

1. A computer-implemented method, comprising:
   (a) obtaining sensor data descriptive of an environment of an autonomous vehicle, the sensor data descriptive of a plurality of objects within the environment;
   (b) determining, using a machine-learned model framework comprising one or more machine-learned models, a joint probability distribution by, for each respective object of the plurality of objects:
      (i) generating a respective plurality of object trajectories by:
         determining an estimated heading for the object; and
         for each object trajectory of the respective plurality of object trajectories, generating the object trajectory from the estimated heading by sampling a trajectory mode from a plurality of trajectory modes and sampling a value for a trajectory control parameter from a range of values associated with the trajectory control parameter; and
      (ii) determining a plurality of probabilities respectively for the respective plurality of object trajectories, the plurality of probabilities conditioned on a respective potential vehicle motion trajectory of a plurality of potential vehicle motion trajectories of the autonomous vehicle; and
   (c) determining, using the machine-learned model framework and from among the plurality of potential vehicle motion trajectories, a target vehicle motion trajectory for the autonomous vehicle based at least in part on the joint probability distribution;
   wherein the one or more machine-learned models were trained based on a loss determined over a subset of the plurality of object trajectories, the subset configured to exclude one or more of the object trajectories that are within a tolerance distance of a corresponding ground truth object trajectory.

2. The computer-implemented method of claim 1, further comprising:
   initiating motion control of the autonomous vehicle based on the target vehicle motion trajectory.

3. The computer-implemented method of claim 1, wherein the plurality of probabilities are conditioned on a conditioning set of the plurality of potential vehicle motion trajectories, the conditioning set comprising a plurality of trajectories of the plurality of potential vehicle motion trajectories.

4. The computer-implemented method of claim 3, further comprising:
   decreasing an interactivity of the autonomous vehicle by increasing a size of the conditioning set.

5. The computer-implemented method of claim 1, wherein the autonomous vehicle is a simulated autonomous vehicle, the plurality of objects are simulated objects, and the environment is a simulated environment for the simulated autonomous vehicle and the simulated objects.

6. The computer-implemented method of claim 1, wherein the plurality of trajectory modes comprise a linear trajectory mode, a circular trajectory mode, and a spiral trajectory mode.

7. The computer-implemented method of claim 1, wherein the machine-learned model framework was trained end-to-end by:
   evaluating a loss over the plurality of probabilities for each respective object of the plurality of objects;
   backpropagating the loss through the machine-learned model framework; and
   updating one or more parameters of the machine-learned model framework based on the backpropagated loss.

8. The computer-implemented method of claim 7, wherein:
   the machine-learned model framework comprises a machine-learned convolutional neural network configured to process the sensor data to generate a spatial map of the environment;
   the joint probability distribution is computed based on the spatial map; and
   updating one or more parameters of the machine-learned model framework based on the backpropagated loss comprises updating one or more parameters of the machine-learned convolutional neural network.

9. The computer-implemented method of claim 7, wherein:
   the machine-learned model framework comprises a machine-learned neural network configured to process the sensor data and an object trajectory to generate a cost for the object trajectory; and
   updating one or more parameters of the machine-learned model framework based on the backpropagated loss comprises updating one or more parameters of the machine-learned neural network.

10. The computer-implemented method of claim 7, wherein the loss comprises:
    an individual loss term based on the marginal probability determined for an object trajectory of the respective object, the object trajectory being within a threshold distance of a ground truth trajectory of the respective object; and
    an interactive loss term based on the pairwise marginal probability determined for a pairing of the object trajectory and another object trajectory for another respective object, the other object trajectory being within a threshold distance of a ground truth trajectory of the other respective object.

11. The computer-implemented method of claim 1, wherein (c) comprises, for each respective potential vehicle motion trajectory:
    (i) for each object trajectory of each respective object, determining a cost associated with the object trajectory and weighting the cost according to a corresponding probability of the plurality of probabilities for the respective object; and
    (ii) determining the target vehicle motion trajectory based on a combined objective comprising: a cost associated with the target vehicle motion trajectory, and a combination of the weighted costs.

12. The computer-implemented method of claim 1, wherein the joint probability distribution is batch processed across the plurality of potential vehicle motion trajectories, the plurality of objects, and the respective pluralities of object trajectories for the plurality of objects.

13. The computer-implemented method of claim 1, wherein the joint probability distribution is computed using message passing.

14. The computer-implemented method of claim 13, wherein the joint probability distribution is computed using loopy belief propagation.

15. An autonomous vehicle control system comprising:
one or more processors; and
one or more computer-readable media storing instructions that are executable to cause the autonomous vehicle control system to perform operations, the operations comprising:
   (a) obtaining sensor data descriptive of an environment of an autonomous vehicle, the sensor data descriptive of a plurality of objects within the environment;
   (b) determining, using a machine-learned model framework comprising one or more machine-learned models, a joint probability distribution by, for each respective object of the plurality of objects:
      (i) generating a respective plurality of object trajectories by:
         determining an estimated heading for the object; and
         for each object trajectory of the respective plurality of object trajectories, generating the object trajectory from the estimated heading by sampling a trajectory mode from a plurality of trajectory modes and sampling a value for a trajectory control parameter from a range of values associated with the trajectory control parameter; and
      (ii) determining a plurality of probabilities respectively for the respective plurality of object trajectories, the plurality of probabilities conditioned on a respective potential vehicle motion trajectory of a plurality of potential vehicle motion trajectories of the autonomous vehicle; and
   (c) determining, using the machine-learned model framework and from among the plurality of potential vehicle motion trajectories, a target vehicle motion trajectory for the autonomous vehicle based on the joint probability distribution;
   wherein the one or more machine-learned models were trained based on a loss determined over a subset of the plurality of object trajectories, the subset configured to exclude one or more of the object trajectories that are within a tolerance distance of a corresponding ground truth object trajectory.

16. The autonomous vehicle control system of claim 15, wherein the operations further comprise:
communicating data descriptive of the target vehicle motion trajectory for execution by the autonomous vehicle.

17. The autonomous vehicle control system of claim 15, wherein the machine-learned model framework was trained end-to-end by:
evaluating a loss over the plurality of probabilities for each respective object of the plurality of objects;
backpropagating the loss through the machine-learned model framework; and
updating one or more parameters of the machine-learned model framework based on the backpropagated loss.

18. The autonomous vehicle control system of claim 17, wherein:
the machine-learned model framework comprises a machine-learned convolutional neural network configured to process the sensor data to generate a spatial map of the environment;
the joint probability distribution is computed based on the spatial map; and
updating one or more parameters of the machine-learned model framework based on the backpropagated loss comprises updating one or more parameters of the machine-learned convolutional neural network.

19. The autonomous vehicle control system of claim 17, wherein:
the machine-learned model framework comprises a machine-learned neural network configured to process the sensor data and an object trajectory to generate a cost for the object trajectory; and
updating one or more parameters of the machine-learned model framework based on the backpropagated loss comprises updating one or more parameters of the machine-learned neural network.

20. An autonomous vehicle comprising:
one or more processors; and
one or more computer-readable media storing instructions that are executable to cause the autonomous vehicle to perform operations, the operations comprising:
   (a) obtaining sensor data descriptive of an environment of an autonomous vehicle, the sensor data descriptive of a plurality of objects within the environment;
   (b) determining, using a machine-learned model framework comprising one or more machine-learned models, a joint probability distribution by, for each respective object of the plurality of objects:
      (i) generating a respective plurality of object trajectories by:
         determining an estimated heading for the object; and
         for each object trajectory of the respective plurality of object trajectories, generating the object trajectory from the estimated heading by sampling a trajectory mode from a plurality of trajectory modes and sampling a value for a trajectory control parameter from a range of values associated with the trajectory control parameter; and
      (ii) determining a plurality of probabilities respectively for the respective plurality of object trajectories, the plurality of probabilities conditioned on a respective potential vehicle motion trajectory of a plurality of potential vehicle motion trajectories of the autonomous vehicle; and
   (c) determining, using the machine-learned model framework and from among the plurality of potential vehicle motion trajectories, a target vehicle motion trajectory for the autonomous vehicle based at least in part on the joint probability distribution; and
   (d) controlling the autonomous vehicle based on the target vehicle motion trajectory;
   wherein the one or more machine-learned models were trained based on a loss determined over a subset of the plurality of object trajectories, the subset configured to exclude one or more of the object trajectories that are within a tolerance distance of a corresponding ground truth object trajectory.

* * * * *